(12) United States Patent
Brillant et al.

(10) Patent No.: US 12,706,378 B2
(45) Date of Patent: Aug. 11, 2026

(54) DEVICES HAVING A PHASED-ARRAY ANTENNA AND CALIBRATION METHOD THEREFOR

(71) Applicant: RAFAEL ADVANCED DEFENSE SYSTEMS LTD., Haifa (IL)

(72) Inventors: Avigdor Brillant, Zichron Yaakov (IL); David Pezo, Netanya (IL); David Cahana, Haifa (IL); Rafael Azoulay, Shimshit (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 378 days.

(21) Appl. No.: 18/280,700

(22) PCT Filed: Feb. 8, 2022

(86) PCT No.: PCT/IB2022/051109
§ 371 (c)(1),
(2) Date: Sep. 7, 2023

(87) PCT Pub. No.: WO2022/214883
PCT Pub. Date: Oct. 13, 2022

(65) Prior Publication Data

US 2024/0145912 A1 May 2, 2024

(30) Foreign Application Priority Data

Apr. 5, 2021 (IL) .......................................... 282139

(51) Int. Cl.
*H01Q 3/26* (2006.01)
*H04B 17/12* (2015.01)
*H04B 17/21* (2015.01)

(52) U.S. Cl.
CPC ............ *H01Q 3/267* (2013.01); *H04B 17/12* (2015.01); *H04B 17/221* (2023.05)

(58) Field of Classification Search
CPC .............. H04B 7/18513; H04B 1/0014; H04B 1/1009; H04B 1/1607; H04B 1/26;
(Continued)

(56) References Cited

U.S. PATENT DOCUMENTS 5,081,460 A * 1/1992 Liu ........................ H01Q 3/267
342/170
2005/0157684 A1* 7/2005 Ylitalo .................. H04L 1/0618
370/334

(Continued)

FOREIGN PATENT DOCUMENTS

| | | | |
|---|---|---|---|
| DE | 10112894 | A1 | 10/2002 |
| EP | 2240795 | A1 | 10/2010 |
| WO | 2021038238 | A1 | 3/2021 |

OTHER PUBLICATIONS

International Search Report for PCT/IB2022/051109 Mailed On May 12, 2022.

(Continued)

*Primary Examiner* — Ajibola A Akinyemi
(74) *Attorney, Agent, or Firm* — Rivka Friedman

(57) ABSTRACT

Methods and devices provide a test signal to each of a plurality of antenna channels via a test signal line. Each antenna channel includes an amplitude adjustor and a phase adjustor associated with at least one antenna element. For each antenna channel, the test signal provided to the antenna channels is modulated to produce a modulated test signal. The modulated test signal is produced by: i) controlling the amplitude adjustor of the antenna channel to vary a current amplitude of the test signal between a plurality of amplitude states, and ii) controlling the phase adjustor of the antenna (Continued)

channel to vary a current phase of the test signal between a plurality of phase states. A received test signal received from the antenna channels is processed to determine amplitude and phase errors associated with the modulated test signals associated with the antenna channels.

18 Claims, 11 Drawing Sheets

(58) Field of Classification Search
CPC .............. H04B 10/25753; H04B 10/61; H04B 2001/0433; H04B 5/48; H04B 7/0626; H04B 7/0658; H04B 7/18506; H04B 7/2041
USPC ........................................................ 455/67.11
See application file for complete search history.

(56) References Cited

U.S. PATENT DOCUMENTS

2006/0033655 A1* 2/2006 Quievy .................. H01Q 3/267
342/194
2009/0153394 A1 6/2009 Navarro et al.
2013/0010851 A1 1/2013 Jaeger et al.
2017/0176507 A1 6/2017 O'Keefe et al.
2018/0159219 A1 6/2018 Vehovc et al.
2019/0372218 A1 12/2019 Vehovc et al.
2020/0169333 A1 5/2020 Tiebout et al.

OTHER PUBLICATIONS

European Search Report for Ep 22784208.5 Mailed On Aug. 28, 2024.
Singapore Search Report for 11202305810P Mailed On Oct. 11, 2024.

* cited by examiner

DEVICES HAVING A PHASED-ARRAY ANTENNA AND CALIBRATION METHOD THEREFOR

TECHNICAL FIELD

The present invention relates to phased-array antenna systems.

BACKGROUND OF THE INVENTION

Active phased arrays are commonly used in various systems that require beam steering for directional signal transmission and/or reception. Such systems include, for example, various wireless communications systems (e.g., 4G/LTE (Long Term Evolution) system, 5G/LTE systems, wireless networking communication system such as wireless local area network (WLAN) systems, and the like), radar systems, electronic warfare (EW) systems, and direction finding (DF) systems.

Phased arrays consist of an array of antenna elements, each antenna element associated with respective amplitude and phase modification circuitry via an antenna feed, for modifying the amplitude and phase of the signal propagating to/from the antenna element. Beam steering is achieved by controlling the amplitude and phase modification circuitry of each antenna element to controllably set the amplitude and phase of the propagating signal to a specific amplitude value and a specific phase value, such that the individual signals constructively interfere with each other in a desired beam direction.

Since the phased array antenna is an active system with a defined number (say N) of radiating antenna elements, there are N phase modification circuits and N amplitude modification circuits. The amplitude modification circuits and phase modification circuits must be calibrated over all of the amplitude and phase states in order to remove amplitude and phase errors.

Conventional calibration techniques inject a reference test signal to an input of each antenna element, and the return signal from the antenna element is compared to the reference input signal using a processing system. By making this comparison, the processing system can obtain the phase and the amplitudes values of each state of the amplitude and phase modification circuitry of each antenna element. However, such conventional techniques assume that there is no leakage between the input reference signal to the antenna and the return signal from the antenna. Such leakage can introduce calibration error, since the leakage signal reduces the signal to noise ratio (SNR) and is at the same frequency as the return signal from the antenna.

One calibration approach which attempts to distinguish between the return signal and the leakage signal is to measure the amplitude and phase of the leakage signal while the antenna is in an off state in order to obtain a reference error phasor. After completing the leakage signal measurement, the antenna element under test is activated and the error phasor is removed from the return signal. However, in many cases there can be a phase ambiguity and an amplitude ambiguity between the leakage signal and the measured return signal, which prevents accurate discrimination between the leakage signal components and the antenna signal components thus preventing removal of the reference error phasor. One way to overcome such ambiguities is by adding a delay line in the return signal path in order to introduce a significant phase difference between the reference signal leakage and the return signal from the antenna. However, delay lines occupy significant area in the phased-array, increasing the overall size phased-array antenna system.

SUMMARY OF THE INVENTION

The present invention is a wireless device having a phased-array antenna, and a method of calibrating the phased-array antenna.

According to the teachings of an embodiment of the present invention, there is provided a method that comprises: providing a test signal to each of a plurality of antenna channels via a test signal line, each antenna channel including an amplitude adjustor and a phase adjustor associated with at least one antenna element; for each of the antenna channels, modulating the test signal provided to the antenna channel to produce a modulated test signal by: i) controlling the amplitude adjustor of the antenna channel to vary a current amplitude of the test signal between a plurality of amplitude states, and ii) controlling the phase adjustor of the antenna channel to vary a current phase of the test signal between a plurality of phase states, and processing a received test signal received from the antenna channels to determine amplitude and phase errors associated with the modulated test signals associated with the antenna channels.

Optionally, the test signal is a continuous wave signal.

Optionally, the test signal is provided to the antenna channels by a transmitter and the received test signal is received by a receiver, and wherein the received test signal includes a plurality of signal components including at least: i) the modulated test signals associated with the antenna channels, and ii) an unmodulated version of the test signal that is leaked from the transmitter to the receiver.

Optionally, the modulated test signal has a constant or variable envelope.

Optionally, the amplitude and phase of the test signal are varied in accordance with a sequence of symbols.

Optionally, the symbols are selected from an alphabet wherein each symbol in the alphabet corresponds to a different respective phase-state and amplitude-state combination.

Optionally, the amplitude and phase of the test signal are varied in accordance with a digital modulation constellation.

Optionally, the processing the received signal includes calculating an error vector magnitude.

Optionally, the amplitude and phase of the test signal are varied in accordance with a sequence of symbols, and wherein the error vector magnitude is calculated for each received symbol.

Optionally, the modulated test signals of a plurality of the antenna channels are produced simultaneously.

Optionally, the modulated test signals of the antenna channels are produced sequentially.

Optionally, a first of the antenna channels is designated as a reference channel, and wherein: i) the amplitude and phase of the test signal provided to the reference channel are varied, and the received test signal is processed to determine amplitude and phase errors associated with the reference channel, and then ii) the amplitude and phase of the test signal provided to one or more of the remaining antenna channels are varied, and the received test signal is processed to determine amplitude and phase errors, relative to the amplitude and phase errors associated with the reference channel, associated with the one or more remaining antenna channels.

Optionally, the processing the received signal includes: isolating residual amplitude modulation effects resultant from phase variations imparted by the phase adjustors, and residual frequency modulation effects resultant from amplitude variations imparted by the amplitude adjustors.

Optionally, the method further comprises: for each of the antenna channels, applying a spreading code to the modulated test signal, wherein the spreading codes are mutually orthogonal.

There is also provided according to the teachings of an embodiment of the present invention, a device that comprises: a plurality of antenna channels, each antenna channel including an amplitude adjustor and a phase adjustor associated with at least one antenna element; a transceiver unit for providing a test signal to the antenna channels via a test signal line and for receiving a received test signal from the antenna channels; and a processing unit associated with the antenna channels and the transceiver configured to: for each antenna channel: control the amplitude adjustor of the antenna channel to vary a current amplitude of the test signal between a plurality of amplitude states, and control the phase adjustor of the antenna channel to vary a current phase of the test signal between a plurality of phase states, to produce a modulated test signal, and process the received test signal to determine amplitude and phase errors associated with the modulated test signals associated with the antenna channels.

Optionally, the device is configured to operate in a first mode and a second mode, wherein when the device operates in the first mode: the processing unit controls the amplitude and phase adjustors, for each of the antenna channels, to vary the current amplitude and phase of the test signal to produce the modulated test signal associated with each of the antenna channels, and processes the received test signal to determine amplitude and phase errors in the modulated test signal associated with each of the antenna channels, and wherein when the device operates in the second mode: the transceiver provides a radio frequency (RF) signal to the antenna channels for transmission by the antenna elements or receives an RF signal via the antenna elements, and wherein the processing unit is configured to actuate the amplitude adjustor and the phase adjustor of each antenna channel to adjust a current amplitude and a current phase of the RF signal according to an appropriate one of the amplitude states and an appropriate one of the phase states.

Optionally, the device is configured in a configuration selected from the group consisting of: a receiver only for receiving radio frequency signals, as a transmitter only for transmitting radio frequency signals, and as a transceiver for transmitting and receiving radio frequency signals.

Optionally, a plurality of transmit paths are provided from the test signal line to output of the antenna channels, and wherein each of the transmit paths is tested separately by passing the test signal to one transmit path at a time.

Optionally, a plurality of transmit paths are provided from the test signal line to output of the antenna channels, and wherein the plurality of transmit paths are tested simultaneously by passing the test signal to the plurality of transmit paths.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
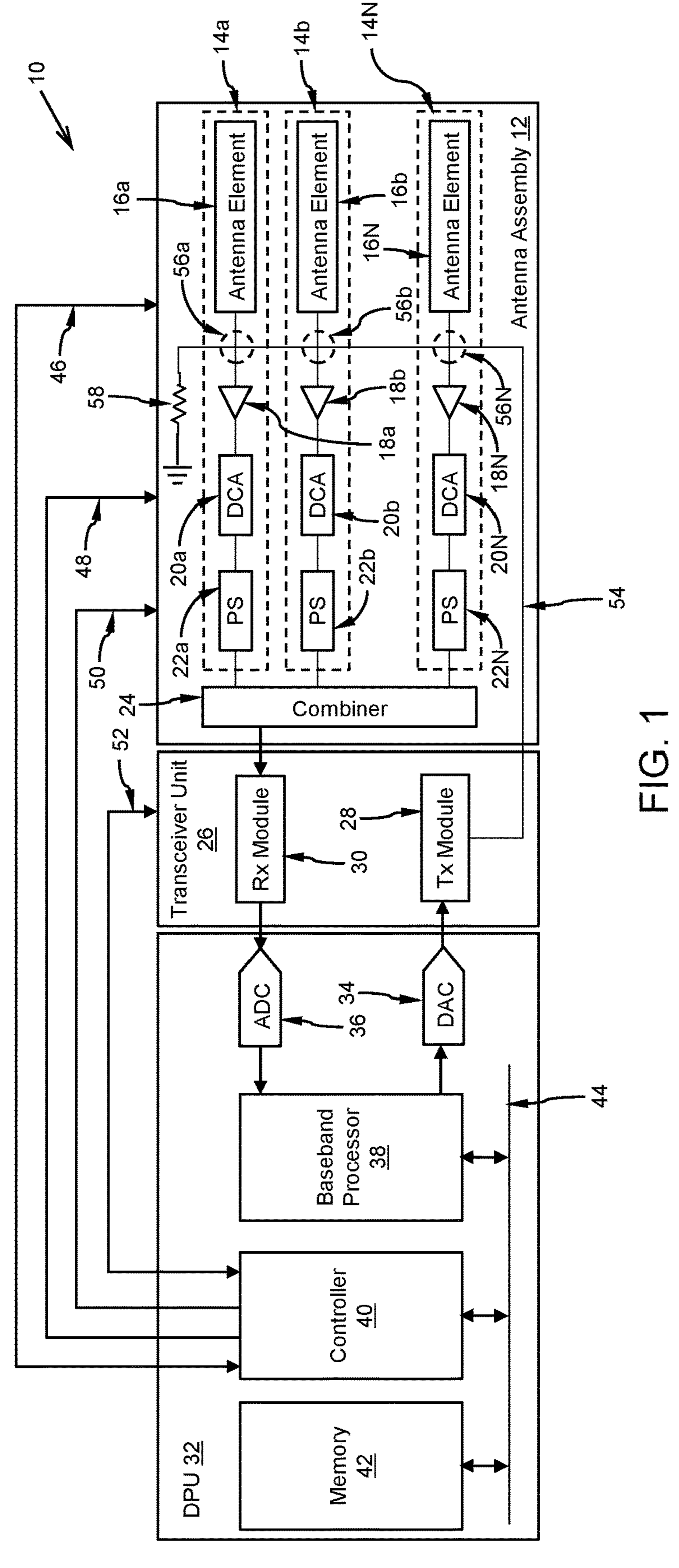
FIG. 1 is a block diagram of a wireless device, according to embodiments of the present disclosure, having a receiver phased-array antenna and having built-in self-test (BIST) capability for testing/calibrating various receive components of the wireless device.

The present invention is a device having a phased-array antenna, and a method for calibrating components of the phased-array antenna.

The principles and operation of the device and method according to present invention may be better understood with reference to the drawings accompanying the description.

The systems and methods according to the present invention have many useful applications and are of particular value when applied within the context of wireless communications systems, electronic warfare (EW) systems, radar systems, direction-finding (DF) systems, and any other system that utilizes beamforming techniques in order to achieve directional signal transmission and/or reception.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2:
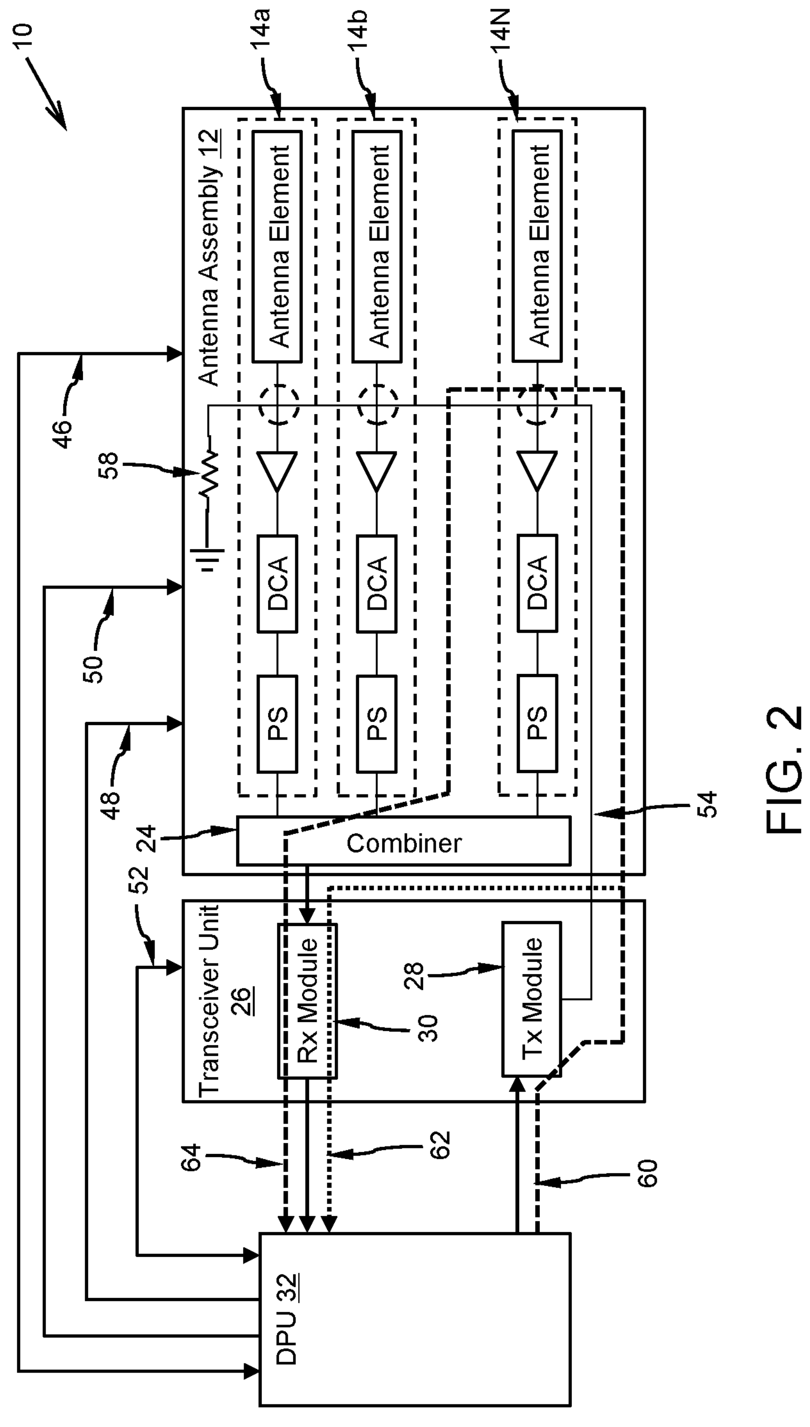
FIG. 2 is a block diagram similar to FIG. 1, showing a test signal, propagating via a test signal line and leakage path, and a corresponding loop-back test signal and leakage signal, when the device performs BIST.

Referring now to the drawings, FIGS. 1 and 2 illustrate a wireless device, generally designated 10, according to certain non-limiting exemplary embodiments of the present disclosure. Generally speaking, the device 10 includes a phased-array antenna assembly 12 (referred to interchangeably herein as an "antenna assembly" or a "phased-array"), a transceiver unit 26 (referred to interchangeably herein as a "transceiver module", "radio frequency (RF) unit", or "RF module"), and a digital processing unit (DPU) 32. The device 10 has built-in self-test (BIST) capability for testing/calibrating various transmit and/or receive components and/or circuits of the device 10, and in particular, components of the antenna assembly 12.

The antenna assembly 12 supports multiple RF channels by way of a plurality of antenna channels 14*a*, 14*b* and 14N that support propagation of RF signals. Although only three antenna channels are illustrated here for simplicity of presentation, the device 10 of the present disclosure is preferably implemented with an antenna array containing at least 2 antenna channels, and more preferably several dozens and up to several hundreds of antenna channels. Each of the antenna channels 14*a*, 14*b* and 14N includes at least one antenna element coupled to signal modification circuitry (which includes phase modification circuitry and signal amplification/attenuation circuitry in the form of an amplifier circuit and an amplitude modification circuit).

The transceiver unit 26 is in signal communication with the antenna assembly 12, and is generally configured to: i) provide RF signals to the antenna assembly 12, and ii): receive RF signals from the antenna assembly 12. The DPU 32 is in signal communication with the transceiver unit 26 and in general performs various functions for the device 10. Those functions may include, for example, processing received signals from the transceiver unit 26, providing signals to the transceiver unit 26 to provide to the antenna assembly 12, and controlling configuration parameters/setting of the transceiver unit 26 and the antenna assembly 12.

Before describing the embodiments of the present disclosure in greater detail, it is noted that the device 10 is configured to operate as a receiver so as to be used for signal reception. As a receiver, the device 10 receives, via antennas of the antenna assembly 12, radio frequency (RF) signals across one or more frequency bands. The received RF signals are distributed to the antenna channels, whereupon the current amplitude and current phase of the signal propagating through each antenna channel is modified to a modified amplitude and modified phase for that antenna channel. The individual signals received by the individual antenna channels are typically combined via power combiner to form a single combined RF signal. The received RF signals can be communication signals transmitted by one or more cooperative transmitters (for example when the device 10 is part of a communication system), communication signals transmitted by one or more non-cooperative transmitters (for example when the device 10 is part of a DF system), radar signals received reflected from a target or object (for example when the device 10 is part of a radar system), or any other suitable type of signal.

As will be discussed, variations of phased-array wireless devices can be employed which operate as a transmitter so as to be used for signal transmission, or as a transceiver so as to be used for both signal reception and transmission.

Figure 10:
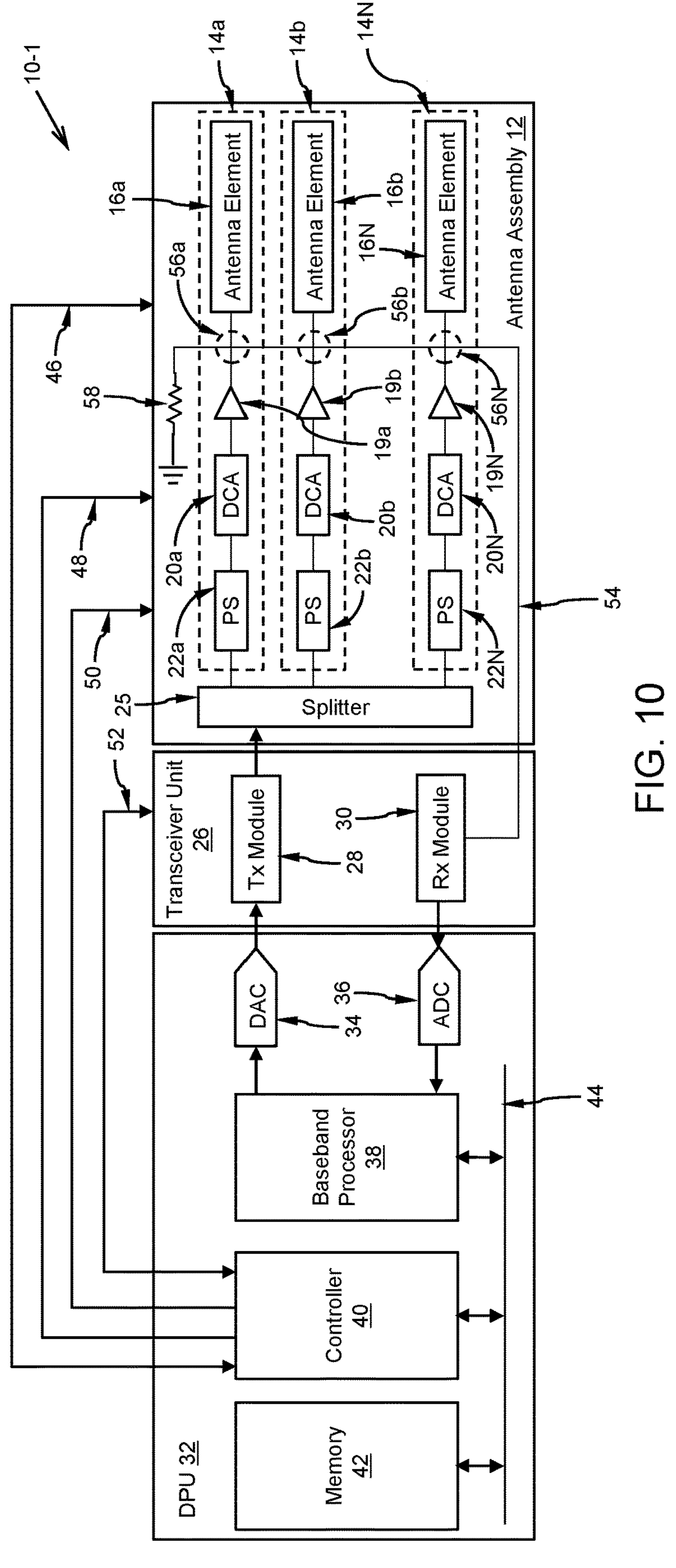
FIG. 10 is a block diagram of a wireless device, according to embodiments of the present disclosure, having a transmitter phased-array antenna and having BIST capability for testing/calibrating various transmit components of the wireless device.
Figure 11:
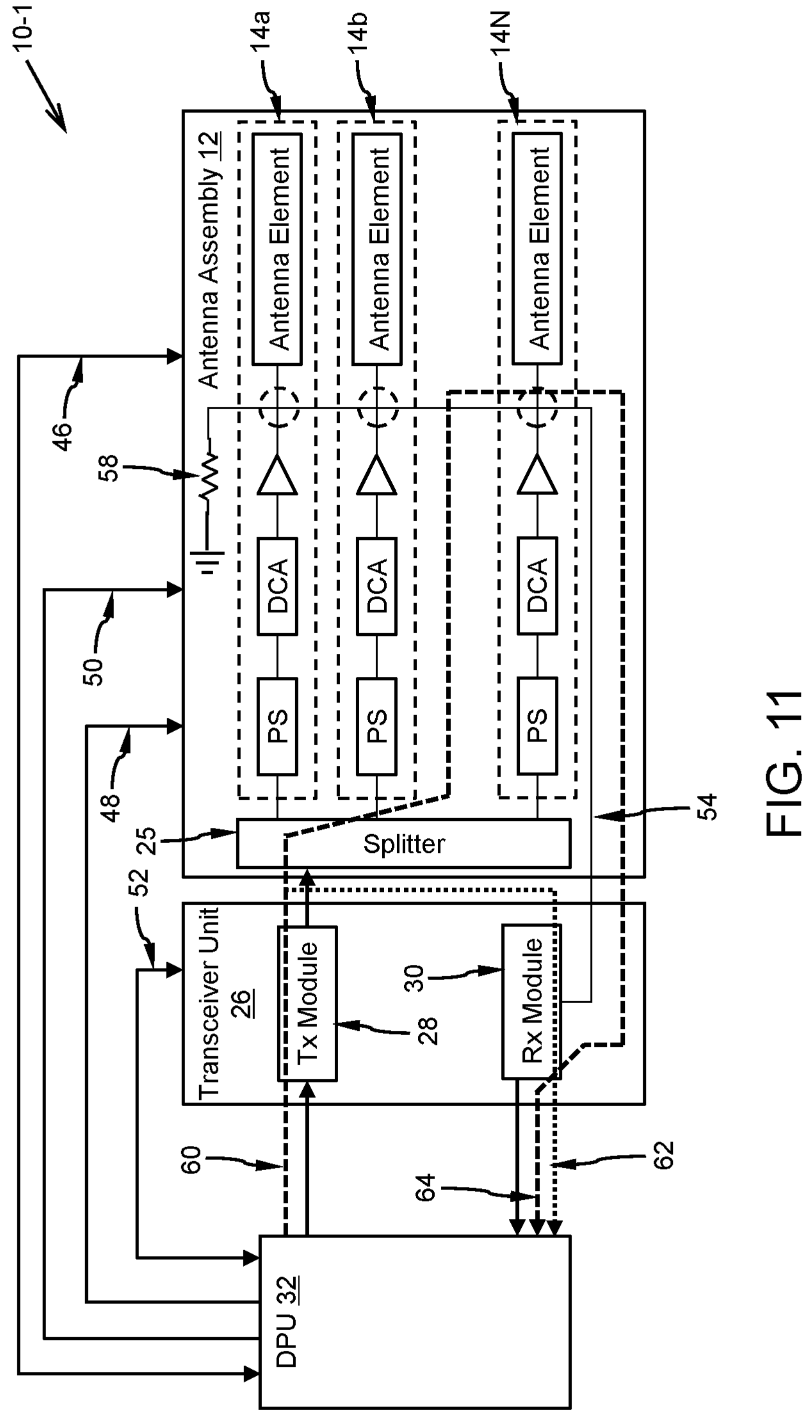
FIG. 11 is a block diagram similar to FIG. 10, showing a test signal, propagating via a test signal line and leakage path, and a corresponding loop-back test signal and leakage signal, when the device performs BIST.

FIGS. 10 and 11 show aspects of a device 10-1, that is a variation of the device 10, that operates as a transmitter. Here, the device 10-1 transmits, via antennas of the antenna assembly 12, radio frequency (RF) signals across one or more frequency bands. Typically, transceiver unit 26 provides an RF signal to the antenna assembly 12, whereupon the RF signal is distributed (usually via a power splitter 25) to the individual antenna channels. Each of the current amplitude and current phase of the signal propagating through each antenna channel is modified to a modified amplitude and modified phase for that antenna channel, such that the phase shifted signals coherently combine such that the effective radiation field at the output of the antenna elements 16*a*, 16*b* and 16N has directionality commensurate with the applied phase shifts. The transmitted RF signals can be communication signals to be received by one or more cooperative receivers (for example when the device 10-1 is part of a communication system), jamming signals directed toward one or more target transceivers (for example when the device 10-1 is used as part of an EW system), radar signals directed towards a target or object (for example when the device 10-1 is part of a radar system), or any other suitable type of signal.

Figure 12:
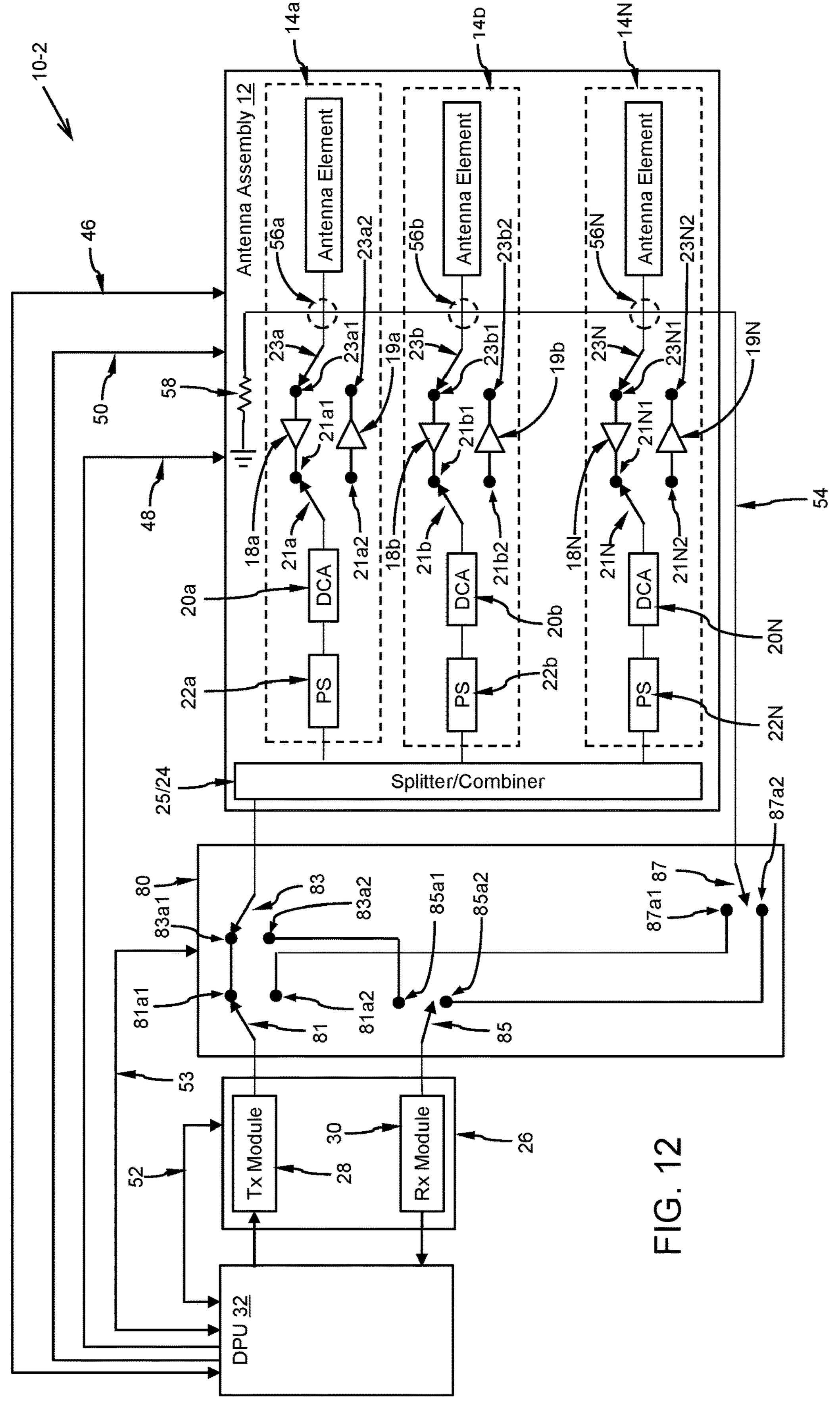
FIG. 12 is a block diagram of a wireless device, according to embodiments of the present disclosure, having a transceiver phased-array antenna employing time division duplexing and having BIST capability for testing/calibrating various transmit and/or receive components of the wireless device.
Figure 13:
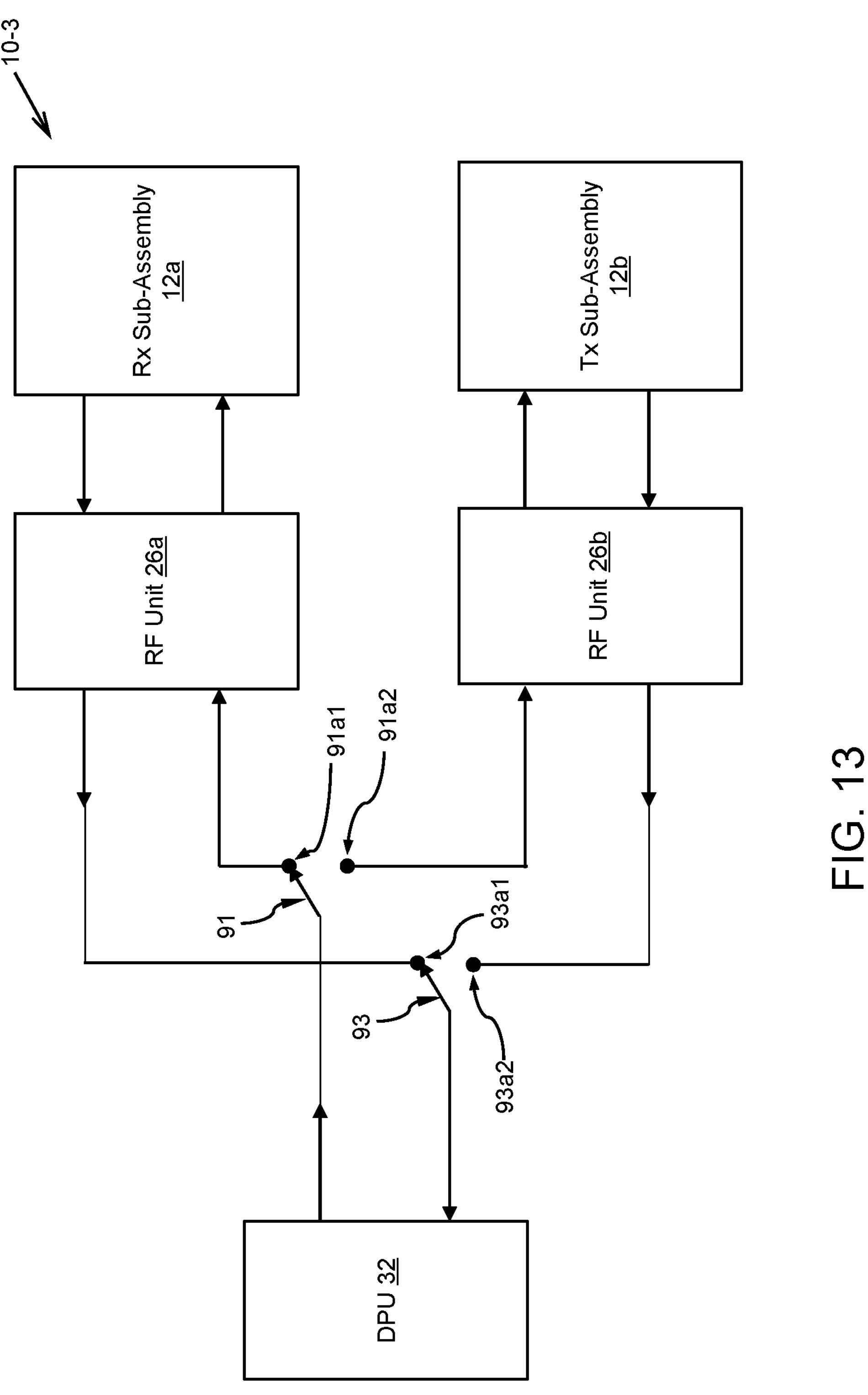
FIG. 13 is a block diagram of a wireless device, according to embodiments of the present disclosure, having a transceiver phased-array antenna employing frequency division duplexing and having BIST capability for testing/calibrating various transmit and/or receive components of the wireless device.

FIGS. 12 and 13 show aspects of devices 10-3 and 10-4, that are variations of the device 10, and that operate as transceivers. Here, the devices 10-3 and 10-4 receive and transmit RF signals via antennas of the antenna assembly 12. The device 10-2 illustrated in FIG. 12 utilizes time division duplexing (TDD) in order to manage transmit and receive operation of the antennas, whereas the device 10-3 illustrated in FIG. 13 utilizes frequency division duplexing (FDD) in order to manage transmit and receive operation of the antennas. The signals received and transmitted by the transceiver devices 10-2 and 10-3 can be any suitable type of signal, including the signal types mentioned above within the context of the configuration of the device as a receiver only or as a transmitter only. In certain cases, all of the antennas can be switched between signal reception and signal transmission modes, while in other cases a subset of the antennas can be fixed as transmit only antennas while another subset of the antennas can be fixed as receiver only antennas.

Throughout a majority portion of the remainder of the present disclosure, the BIST calibration procedure will be described within the non-limiting context of the device 10, which is configured as a receiver. This is merely for ease and clarity of explanation of the BIST/calibration methodology according to the various embodiments of the present disclosure, and should not in any way limit the scope of the present disclosure to a particular wireless device configuration as a receiver, transmitter, or transceiver. It will be clear to those of ordinary skill in the art that the BIST/calibration capability of the device 10 is also applicable to wireless devices configured as transmitters or transceivers, such as the non-limiting exemplary transmitter device 10-1 (FIGS. 10 and 11), or the non-limiting exemplary transceiver devices 10-2 and 10-3 (FIGS. 12 and 13). A more detailed description of the components and operation of the devices 10-1, 10-2 and 10-3 will be provided toward the end of the present document.

The device 10 is configured to selectively operate in two modes: i) a calibration (first) mode in which the device 10 performs BIST/calibration procedures to test/calibrate various receive components/circuits, and ii) an operational (second) mode in which the device 10 operates as a receiver for receiving RF signals.

As will be discussed in further detail below, when operating in calibration mode, the DPU 32 of the device 10 is configured to generate a test signal that is injected (via the transceiver unit 26) into one or more signal paths (receive paths or reception paths) associated with the antenna assembly 12, and to process a received test signal (received from the antenna assembly 12 via the transceiver unit 26) to determine errors imparted by components of the antenna assembly 12.

Returning now to FIGS. 1 and 2, the details of the signal modification circuitry of each of the antenna channels 14*a*, 14*b* and 14N will now be described in greater detail. In the illustrated example, the signal modification circuitry includes an amplifier circuit, an amplitude adjustor circuit, and a phase adjustor circuit. In the illustrated example, the antenna channel 14*a* includes the antenna element 16*a*, the low noise amplifier circuit 18*a*, the amplitude adjustor circuit 20*a*, and the phase adjustor circuit 22*a*; the antenna channel 14*b* includes the antenna element 16*b*, the low noise amplifier circuit 18*b*, the amplitude adjustor circuit 20*b*, and the phase adjustor circuit 22*b*; and the antenna channel 14N includes the antenna element 16N, the low noise amplifier circuit 18N, the amplitude adjustor circuit 20N, and the phase adjustor circuit 22N.

When the device 10 operates in calibration mode, each antenna channel has an associated reception path along which the injected test signal propagates. The reception path of each antenna channel is defined at least in part by the amplifier circuit, amplitude adjustor circuit, and phase adjustor circuit of the antenna channel.

Each of the antenna elements 16*a*, 16*b* and 16N is operable to receive a plurality of RF signals across a frequency band. In certain non-limiting implementations, the antenna elements 16*a*, 16*b* and 16N operate to capture RF signals across the same frequency band, while in other non-limiting implementations, some of the antenna elements 16*a*, 16*b* and 16N operate to capture RF signals across different respective frequency bands. The frequency band may span across portions of one or more sub-bands of the radio spectrum, including, for example, the high frequency (HF) band (covering frequencies in the range of 3-30 MHz), the very high frequency (VHF) band (covering frequencies in the range of 30-300 MHz), the ultra-high frequency (UHF) band (covering frequencies in the range of 300-3000 MHz), the super high frequency (SHF) band (covering frequencies in the range of 3-30 GHz), and the extremely high frequency (EHF) band (covering frequencies in the range of 30-300 GHz.

It is noted that the terms "antenna" and "antenna element" may be used interchangeably. An antenna element may be implemented with a patch antenna, a dipole antenna, or an antenna of some other type. Each of the antenna elements 16*a*, 16*b* and 16N may be a single antenna element, or a plurality of antenna elements, which may be arranged in a grid or other suitable arrangement of antenna elements. Furthermore, each of the antenna channels 14*a*, 14*b* and 14N can include the same number of antenna elements, or the number of antenna elements may vary from one channel to another channel. For example, one of the antenna channels may include two antenna elements, while another of the antenna channels may include four antenna elements.

The antenna elements 16*a*, 16*b* and 16N are in signal communication with the respective amplifier circuits 18*a*, 18*b* and 18N via one or more respective antenna feeds. The amplifier circuits 18*a*, 18*b* and 18N are configured to amplify the signals received from the antenna feeds (which may be RF signals from the antenna elements 16*a*, 16*b* and 16N when operating in operational mode, or may be the injected test signal when operating in calibration mode). The amplifier circuits 18*a*, 18*b* and 18N are preferably implemented as low-noise amplifiers (LNAs).

The amplifier circuits 18*a*, 18*b* and 18N are in signal communication with the respective amplitude adjustor circuits 20*a*, 20*b* and 20N such that the signals that are amplified by the amplifier circuits 18*a*, 18*b* and 18N are provided to the amplitude adjustor circuits 20*a*, 20*b* and 20N. In a preferred but non-limiting implementation, each of the amplitude adjustor circuits 20*a*, 20*b* and 20N is implemented as a digitally controlled attenuator (DCA). It is noted, however, that the amplitude adjustor circuits 20*a*, 20*b* and 20N can be implemented in other ways which provide controlled amplitude variation of input signals, including, but not limited to, implementation as digitally controlled amplifiers (variable-gain amplifiers that are digitally controlled), programmable gain amplifiers, and the like. Throughout the remainder of the present description, the terms amplitude adjustor circuit, amplitude adjustor module, amplitude adjustor, amplitude modification circuitry, amplitude modification module, amplitude modifier, and DCA will be used interchangeably without loss of generality. The DCAs 20*a*, 20*b* and 20N are configured to controllably adjust the amplitude of received input signals, e.g., the amplified signals received from the amplifier circuits 18*a*, 18*b* and 18N. In particular, each of the DCAs 20*a*, 20*b* and 20N varies a current amplitude of the respective received input signal between a plurality of amplitude states (also referred to as attenuation states), based on control signal input received from a control device. The input signal can be a test signal (when the device 10 operates in calibration mode), or an RF signal received by the antenna elements 16*a*, 16*b* and 16N.

The amplitude adjustors 20*a*, 20*b* and 20N are in signal communication with the respective phase adjustor circuits 22*a*, 22*b* and 22N. The phase adjustor circuits, are preferably implemented as digitally controlled phase shifters. Throughout the remainder of the present description, the terms phase adjustor circuit, phase adjustor module, phase adjustor, phase modification circuitry, phase modification module, phase modifier, and phase shifter (or PS) will be used interchangeably without loss of generality. The phase shifters 22*a*, 22*b* and 22N are configured to controllably adjust the phase of received input signals, e.g., the signals received from the DCAs 20*a*, 20*b* and 20N. In particular, each of the phase shifters 22*a*, 22*b* and 22N varies a current phase of the respective received input signal between a plurality of phase states, based on control signal input received from a control device. Each of the phase shifters 22*a*, 22*b* and 22N shifts the current phase of the signal by a different amount such that the radiation field of the signal received by or transmitted by the antenna elements 16*a*, 16*b* and 16N is a result of coherent combination of the individual phase shifted signals at the desired direction of radiation.

In certain preferred embodiments, the amplifier circuit, DCA, and phase shifter of each antenna channel are implemented within a single integrated circuit, referred to interchangeably as a "core-chip". The core-chip of each antenna channel may include one or more computer processors and memories, and can be programmed to store amplitude state and phase state information associated with the DCA and phase shifter. Any amplitude or phase corrections to be applied to amplitude and phase variations imparted by the DCA and phase shifter can be applied by the processing components of the core-chip based on instruction from the DPU 32.

In the present example in which the device 10 is configured as a receiver (i.e., the antenna elements 16*a*, 16*b* and 16N are configured for signal reception), the antenna assembly 12 includes a power combiner 24 in signal communication with the phase shifters 22*a*, 22*b* and 22N for combining the signals at the output of the phase shifters 22*a*, 22*b* and 22N into a single combined RF signal.

The transceiver unit 26 includes a receiver (Rx) module 30 that is in signal communication with the antenna assembly 12 via the power combiner 24. The Rx module 30 is configured to receive the single output RF signal from the power combiner 24, and down-convert the RF signal to an intermediate frequency (IF) or to analog baseband, thereby producing an IF or analog baseband signal. The Rx module 30 preferably includes down-conversion circuitry, in the form of, for example, a frequency mixer, for down-converting the RF signals.

The transceiver unit 26 also includes a transmitter (Tx) module 28 that is in signal communication with the antenna assembly 12. As will be discussed, in the present configuration of the device 10 as a receiver, the Tx module 28 is used in order to provide a test signal 60 (FIG. 2) to the antenna assembly 12 in order to perform BIST/calibration. The Tx module 28 preferably includes up-conversion circuitry, in the form of, for example, a frequency mixer, for up-converting IF or analog baseband signals to RF signals.

In the illustrated embodiment, the DPU 32 includes a digital-to-analog (DAC) converter 34, an analog-to-digital converter (ADC) 36, a digital baseband processor 38 (also referred to as a "baseband processor" or "processor"), a controller 40, and at least one memory 42.

The ADC 36 is in signal communication with the Rx module 30, and is configured to convert the IF or analog baseband signals from the Rx module 30 to digital signals, i.e., to digitize the signals from the Rx module 30. In preferred embodiments, the ADC 36 is a high-speed high-dynamic-range ADC. The ADC 36 performs digitization using techniques well-known to those of ordinary skill in the art, including, sampling and quantization of incoming analog signals.

The baseband processor 38 is in signal communication with the ADC 36, and is configured to receive and process digitized signals from the ADC 36. When the device 10 operates in calibration mode, the baseband processor 38 processes the digitized signals in order to determine errors imparted by the DCAs 20*a*, 20*b* and 20N and the phase shifters 22*a*, 22*b* and 22N. Here, the received digitized signals are calibration loop-back test signals between the Tx module 28 and the Rx module 30, that traverse through the various transmission paths of antenna channels 14*a*, 14*b* and 14N. As a consequence of the leakage between the Tx module 28 and the Rx module 30, the received digitized signals also include as signal components the leakage signal 62 that leaks directly from the Tx module 28 to the Rx module 30. The processing for determining the errors imparted by the DCAs and phase shifters, in the presence of the leakage signal 62, will be described in detail in subsequent sections of the present disclosure.

When the device 10 operates in operational mode, the baseband processor 38 is also configured to process the down-converted and digitized versions of the RF bearing information signals received by the antenna elements 16*a*, 16*b* and 16N. Such processing can include, for example, demodulation, symbol-to-bit de-mapping, digital filtering, equalization, forward error correction decoding, source decoding (i.e., data decompression), and the like.

The controller 40, which includes at least one computer processor coupled to a computer memory or storage device, is configured to control operations of the device 10 and perform configuration management of the DPU 32, the transceiver unit 26, and the antenna assembly 12. The controller 40 is configured to control operations of the device 10 by controlling switching between calibration and operational modes. The control and configuration management of the transceiver 26 provided by the controller 40 includes, for example, setting frequency parameters/settings of local oscillators of the transceiver unit 26, gain/attenuation parameters of circuits in the RF chain of the transceiver unit 26, and the like. The controller 40 provides such control and configuration management to the transceiver 26 by providing control signals via, for example, control line 52.

The controller 40 is further configured to control the DCAs 20*a*, 20*b* and 20N and the phase shifters 22*a*, 22*b* and 22N to vary the amplitude and phase of RF signals propagating along signal paths of the antenna channels 14*a*, 14*b* and 14N. The controller 40 provides such control of the DCAs 20*a*, 20*b* and 20N via one or more control lines, represented as control line 48. It should be noted that each DCA may be provided with its own control line from the controller 40. The controller 40 provides such control of the phase shifters 22*a*, 22*b* and 22N via one or more control lines, represented as control line 50. It should be noted that each phase shifter may be provided with its own control line from the controller 40.

The controller 40 is also configured to receive configuration status information from the antenna assembly 12, via for example the control line 46.

The memory 42 can be implemented as any computer storage medium that can preferably be erased and reprogrammed, including, for example, flash memory, electronic erasable programmable read only memory (EEPROM), read only memory (ROM), and random-access memory (RAM). The memory 42 is preferably configured to store data and computer instructions for executing the functionality of the controller 40 and/or the baseband processor 38.

All of the components of the DPU 32 are in communication with each other (signal or data communication) either directly or indirectly. In the illustrated non-limiting example, communication between the baseband processor 38, controller 40 and memory 42 is provided via a data bus 44.

When the device 10 operates in a calibration mode, the baseband processor 38 is additionally configured to generate a digital test signal, e.g., a digital test tone. The DAC 34 is in signal communication with the baseband processor 38, and is configured to convert the digital test to an analog IF or baseband test signal. The Tx module 28 up-converts the IF or analog baseband test signal to RF, thus producing an RF test signal of known amplitude, phase, and frequency. The RF test signal (i.e., the signal 60 in FIG. 2) is preferably a continuous wave (CW) test signal. The Tx module 28 feeds and distributes the test signal 60 to each of the antenna elements 16*a*, 16*b* and 16N via a test signal line 54 that is coupled to the antenna channels 14*a*, 14*b* and 14N via respective electro-magnetic couplings 56*a*, 56*b* and 56N. In certain non-limiting implementations, the test signal 60 is distributed via the test signal line 54 which is implemented as a transmission line coupled to each antenna element 16*a*, 16*b* and 16N at the feed between the antenna element 16*a*, 16*b* and 16N and the amplifier circuit 18*a*, 18*b* and 18N and terminated by a load (schematically represented by resistor 58). In other non-limiting implementations, the test signal 60 is distributed to the antenna elements 16*a*, 16*b* and 16N via an electromagnetic power coupling/splitter.

As discussed, conventional BIST/calibration techniques for an active phased array employ injecting a reference test signal (preferably a CW tone) to the input of the antenna channels, and comparing the output signal from the antenna channels to the reference input signal. The comparison is typically performed by a processing element of a processing unit, such as the baseband processor 38. This comparison obtains the phase and the amplitude values for each of the phase and amplitude states of each of the antenna channels. It is also common practice to first inject the test signal into one of the antenna channels, designated as a "reference channel", at each of the amplitude and phase states. The received loop-back test signal at the amplitude and phase states is detected/measured by a processor (e.g., the baseband processor 38) and stored as a reference. The loop-back signal response from all of the other antenna channels are measured relative to the reference in order to produce relative amplitude and phase errors (between each of the other antenna channels and the reference channel). One method for measuring the amplitude and phase errors imparted components of the antenna channels uses frequency domain analysis on the received test signal. For example, the Fast Fourier Transform (FFT) can be applied to the received test signal and compared to the FFT of the input test signal. The FFT of the received test signal can be multiplied with the conjugate of the FFT of the input test signal. For example, if the input test signal has phase $\alpha_1$, amplitude $A_1$, and radial frequency $\omega_1$, the input test signal $V_1$ and its conjugate $V_1^*$ can be expressed as:

$$V = A_1 e^{(j\omega_1 t + j\alpha_1)}$$

$$V_1^* = A_1 e^{(-j\omega_1 t - j\alpha_1)}$$

Furthermore, if the test signal after loop-back through the reference channel at a given phase and amplitude state has phase $\alpha_{11}$, amplitude $A_{11}$, and radial frequency $\omega_1$, the received loop-back test signal $S_{11}$ can be expressed as:

$$V_{11} = A_{11} e^{(j\omega_1 t + j\alpha_{11})}$$

Taking the product of the arguments of $V_1^*$ and $V_{11}$ yields the following:

$$e^{(j\omega_1 t + j\alpha_{11})} \times e^{(-j\omega_1 t - j\alpha_1)} = e^{(j\alpha_{11} - j\alpha_1)} = e^{(j\Delta\alpha)}$$

Thus, the phase difference ($\Delta\alpha_{11}$) between the input test signal phase and received test signal phase (after loop-back through the reference channel) at the given phase state is obtained. This phase difference is denoted as the reference channel phase offset/error for the given state, and the process can be repeated for each of the phase states of the reference channel. For example, for the $k^{th}$ channel, the phase difference between the input test signal phase and received test signal phase (after loop-back through the $k^{th}$ channel) is denoted $\Delta\alpha_{kk}$. The received test signal, after loop-back through each of the remaining antenna channels (i.e., the non-reference channels), can be compared with the reference phase difference $\Delta\alpha_{11}$. The relative phase error for a given channel n measured relative to the reference phase difference (assuming channel 1 is the reference channel) is denoted as $\Delta\alpha_{n,1}$ and can be expressed as:

$$\Delta\alpha_{n,1} = \Delta\alpha_{n1} - \Delta\alpha_{11}$$

A similar process can be applied to determine the relative amplitude errors for each amplitude state. However, since the amplitude of the signals are phasor magnitudes, it is more convenient to express the relative amplitude errors $\Delta A_{n,1}$ as a log ratio as follows:

$$\Delta A_{n,1}[\text{dB}] = 20\log_{10}\left(\frac{A_{n1}}{A_{11}}\right)$$

The above-described calibration techniques become problematic when a leakage signal is introduced between the Tx module and the Rx module. In particular, as illustrated in FIG. 2, the received loop-back signal 64 includes an additional signal component in the form of leakage signal 62 (which is typically a CW tone) that propagates directly from the Tx module to the Rx module without passing through the antenna assembly 12. Since the leakage signal does not propagate through the antenna assembly 12, the amplitude and phase of the leakage signal 62 are independent from the amplitude and phase states imparted by the DCAs and the phase shifters of the antenna channels. Note that the amplitude and phase of the leakage signal are also typically constant, for example in situations in which the test signal 60 is a CW tone. Thus, the additional leakage tone can introduce phase and/or amplitude ambiguities in the received loop-back signals 64, which can dramatically reduce calibration accuracy.

Figure 3:
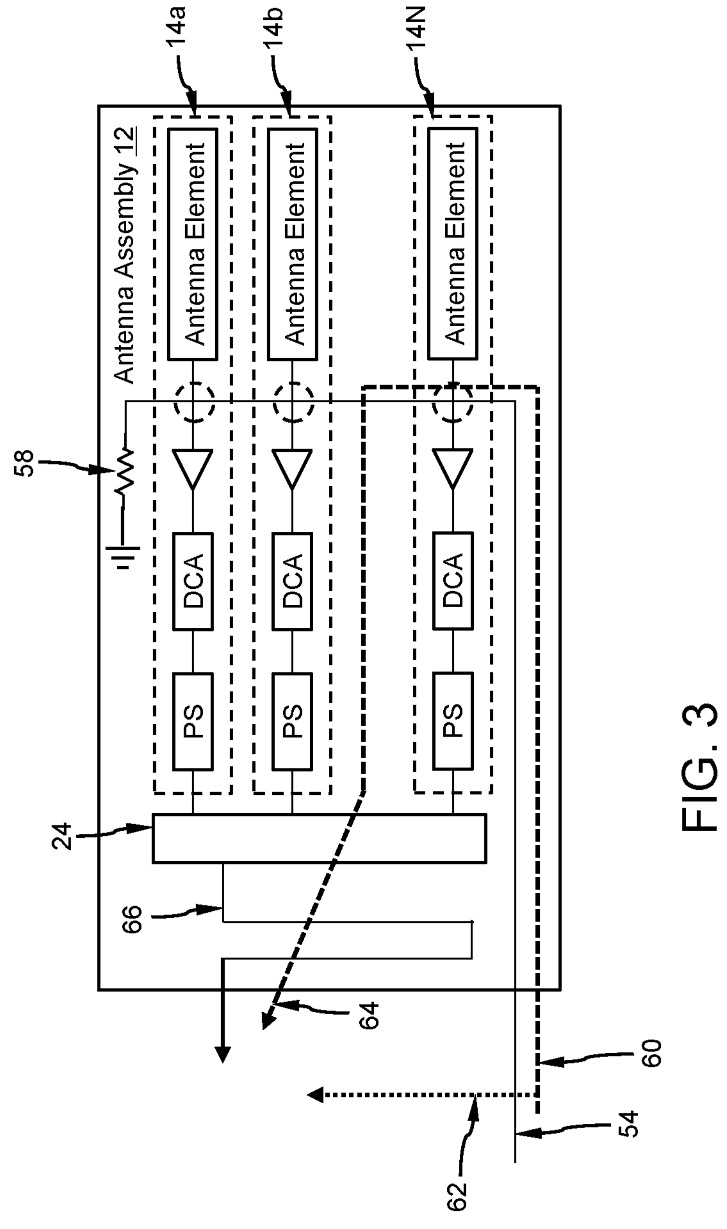
FIG. 3 is a block diagram similar to FIG. 2, showing a delay line at an output of antenna channels of the phased-array antenna.

As mentioned in the background section, one method to combat ambiguities is to introduce a phase delay in the loop-back signal 64 via a delay line at the antenna assembly 12 output. FIG. 3 shows a delay line 66 provided at the output of the combiner 24. The delay line introduces a significant enough phase difference between the loop-back signal 64 and the leakage signal 62 such that reference phase of the loop-back signal 64 can be discriminated against the phase of the leakage signal 62. However, the delay line 66 should be sufficiently long in order to introduce enough of a phase delay so as to enable robust discrimination. In order to provide a delay line of sufficient length, a significant amount of area within the antenna assembly 12 needs to be allocated exclusively for the delay line 66, thereby increasing the overall size and weight requirements of the antenna assembly 12.

Embodiments of the present disclosure are directed to BIST/calibration methods that provide solutions which overcome the problems of ambiguities introduced by leakage signals, without necessitating the use of long delay lines that occupy significant area in the antenna assembly 12. In general, the BIST/calibration methods of the present disclosure employ modulation and detection schemes whereby the test signal propagating through each of the antenna channels 14*a*, 14*b* and 14N is modulated according to a modulation scheme to produce a modulated test signal for each antenna channel, and whereby the received test signal is processed by the DPU 32 in order to identify amplitude and phase errors associated with the modulated signals. The modulation applied by each antenna channel "colors" the test signal by using the DCAs 20*a*, 20*b* and 20N and the phase shifters 22*a*, 22*b* and 22N to vary (i.e., modulate) the amplitude and phase of the test signals between a plurality of amplitude states and phase states, thereby generating a unique spectral mask for the modulated test signals. Since the leakage signal is a CW signal having constant amplitude, phase and frequency, the DPU 32 is able to process the received test signals (i.e., signal 64 in FIG. 2) to determine the of amplitude and phase errors in the received test signal (that includes modulated test signal and leakage signal components). Since the amplitude, phase and frequency of the generated test signal 60 are known to the DPU 32 (since the DPU 32 generates the test signal 60 that is provided to the Tx module 28 for up-conversion), the DPU 32 can perform various processing functions (such as demodulation, detection, sequence detection, etc., examples of which will be provided in subsequent sections of the present disclosure) to recover the transmitted test signal 60 from the received test signal 64 and thereby determine amplitude and phase errors (channel impairments) imparted by the DCA and phase shifter for each antenna channel. The DPU 32 may process the received test signal by identifying variations in the amplitude and/or phase in the received test signal that are resultant from the amplitude and phase modulation imparted by the DCA and phase shifter of the antenna channel.

Figure 4:
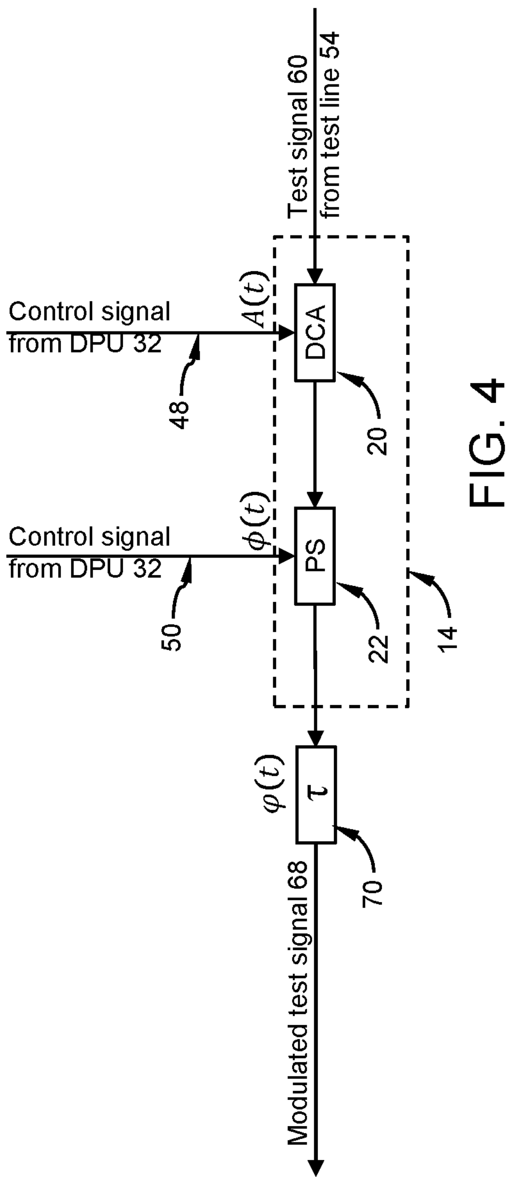
FIG. 4 is a block diagram of an exemplary antenna channel of the phased-array antenna of FIG. 1, including amplitude modification circuitry and phase modification circuitry for producing a modulated test signal according to embodiments of the present disclosure.

Bearing all of the above in mind, attention is now directed to FIG. 4, which illustrates a portion of a representative one of the antenna channels 14*a*, 14*b* and 14N, generally designated 14, and a signal path of the test signal 60 through the antenna channel 14. Also shown in FIG. 4 are the control lines 48, 50 (from the DPU 32) coupled to the DCA 20 and the phase shifter 22 for controlling the amplitude and phase of the test signal (in response to controlled input from the DPU 32) so as to produce a modulated test signal 68. It is noted that for simplicity of presentation, the test line and the antenna element, amplifier circuit, and electro-magnetic coupling of the antenna channel, are not shown in FIG. 4. It may be presumed that the test signal 60 is injected to the antenna channel 14 via the test line 54 (FIG. 2) and an electro magnetic coupling (e.g., couplings 56*a*, 56, 56N), and that the injected test signal undergoes amplification by the amplifier circuit of the antenna channel 14 prior to reaching the input to the DCA 20.

In order to generate the modulated test signal 68, the DPU 32 actuates/controls the DCA 20 and phase shifter 22 (via control lines 48, 50) to respectively vary the current amplitude and the current phase of the test signal 60 between a plurality of respective amplitude states and phase states. In one particular non-limiting implementation, the controller 40 sends the current amplitude state information to the DCA 20 via the control line 48 such that the DCA 20 toggles the amplitude between a current amplitude state and a different amplitude state. Similarly, the controller 40 may send the current phase state information to the phase shifter 22 via the control line 50 such that the phase shifter 22 toggles the phase between a current phase state and a different phase state. The varying amplitude and phase of the test signal (imparted by the DCA 20 and the phase shifter 22) result in time-varying amplitude and phase functions, denoted as $A(t)$ and $\phi(t)$, respectively.

In certain non-limiting implementations, the current amplitude and the current phase of the test signal is modulated in a substantially continuous manner over a range encompassing the amplitude and phase states. Thus, for example, the current amplitude and the current phase of the test signal can be modulated according to a sinusoidal modulation or any other continuous function typically used for modulating waveforms.

In certain particularly preferred implementations, the current amplitude and current phase of the test signal is modulated according to a digital modulation scheme, whereby discrete steps equivalent to a step function variation of the amplitude state and a step function variation of the phase state are used. Here, the DCA 20 varies the current amplitude such that the amplitude assumes one of L possible amplitude values/states based on certain particular bit values of a bit sequence, and whereby the phase shifter 22 varies the current phase such that the phase assumes one of M possible phase values/states based on other particular bit values of the bit sequence. For example, the DCA 20 may select the amplitude state based on a sequence of l bits, where $L=2^l$. Each unique l-bit sequence corresponds to a unique amplitude state. Similarly, the phase shifter 22 may select the phase state based on a sequence of m bits, where $M=2^m$. Each unique m-bit sequence corresponds to a unique amplitude state. The amplitude and phase states can be mapped into a symbol of the modulation constellation by the DPU 32 using a bit-to-symbol mapper (for example implemented in software or firmware in the baseband processor 38), such that each symbol corresponds to a unique amplitude-phase state combination. By transmitting, via the DPU 32 the Tx module 28 and the antenna channel 14, a known sequence of symbols (selected from a symbol alphabet), the test signal is modulated according to the amplitude-phase states corresponding the symbol sequence, and the received sequence of symbols can be compared against the transmitted sequence of symbols in order to extract errors (amplitude and phase errors) imparted by the DCA 20 and phase shifter 22 of the antenna channel 14. This process can be repeated for each of the antenna channels, and the errors are preferably measured relative to a reference antenna channel.

Each symbol amplitude-phase state combination can be represented as a phasor in a constellation diagram. Each unique sequence of l+m bits corresponds to a unique symbol in the constellation. Thus, the phasor that encompasses all possible amplitude-phase state combinations, and can be represented as:

$$R(t) = A(t)e^{j\phi(t)}$$

It is noted that since there is a delay (represented by delay element $\tau$ designated 70) between the output of the antenna channel 14 and the output of the antenna assembly 12, an additional time-varying phase delay $\varphi(t)$ is present at the output of the antenna assembly 12. Thus, the phasor, R(t), can more accurately be expressed as:

$$R(t) = A(t)e^{(j\phi(t)+j\varphi(t))}$$

In a particularly preferred but non-limiting implementation, the digital modulation scheme employs a complex circular/ring modulation constellation that generates constant envelope modulated test signals. This preferred implementation provides certain advantages by exploiting the inherent symmetry of the modulation constellation. Although circular modulation is a preferable modulation scheme, it should be apparent to those of ordinary skill in the art that various other suitable digital modulation schemes, including those having variable envelope, such as, for example, quadrature amplitude modulation (QAM), m-ary phase shift keying (MPSK), and amplitude phase shift keying (APSK), can be employed in order to produce the modulated test signal for calibration. Furthermore, analog modulation schemes, including amplitude modulation (AM), phase modulation (PM), single sideband (SSB), double sideband (DSB), and the like, can also be used in order to generate the modulated test signal for calibration purposes. For simplicity of explanation, throughout the majority of the remaining portions of the present description, the modulation and processing procedure for calibration will be described within the context of the non-limiting circular modulation constellation example.

Figure 5:
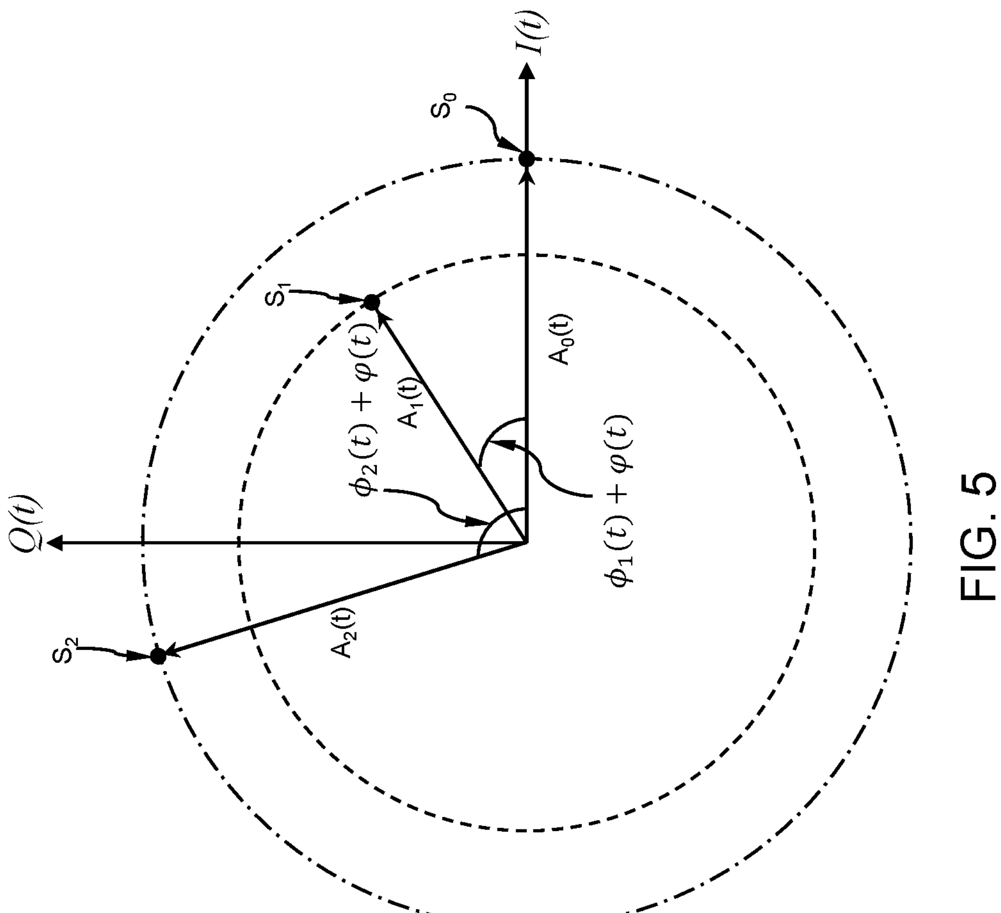
FIG. 5 is a signal-space diagram of exemplary symbols generated according an exemplary modulation scheme according to embodiments of the present disclosure.

FIG. 5 illustrates a constellation diagram of a circular modulation scheme according to a preferred but non-limiting implementation of the present disclosure. The constellation diagram depicts example symbols in a signal space having in-phase (I) and quadrature (Q) components, plotted on the real axis I(t) and the imaginary axis Q(t). Three example symbols, designated $S_0$, $S_1$, and $S_2$, are labeled in the constellation diagram. These symbols include additional phase offsets due to the delay element 70. As illustrated, symbol $S_1$ corresponds to amplitude $A_1(t)$ and phase $\phi_1(t)+\varphi(t)$, symbol $S_2$ corresponds to an amplitude $A_2(t)$ and phase $\phi_2(t)+\varphi(t)$, and symbol $S_0$ corresponds to an amplitude $A_0(t)$ and a phase of $\phi_0(t)+\varphi(t)$ (the phase is not shown in FIG. 5 for reasons that will be explained below). The amplitudes $A_0(t)$, $A_2(t)$ and $A_3(t)$ are the signal-space amplitude modulation functions applied by the DCA 20 corresponding to the symbol $S_0$, $S_1$ and $S_2$, respectively. Similarly, the phases $\phi_0(t)$, $\phi_1(t)$ and $\phi_2$ (t) are the signal-space phase modulation functions applied by the phase shifter 22 corresponding to the symbol $S_0$, $S_1$ and $S_2$, respectively. The phase component $\varphi(t)$ in each of the symbols is the phase delay imparted by the delay element 70. Note that in the present example, the symbol $S_0$ corresponds to a zero-phase state (i.e., no phase shift applied by the phase shifter 22) thus it represents pure amplitude modulation and can be used as a reference symbol for processing, as will be discussed.

Figure 6:
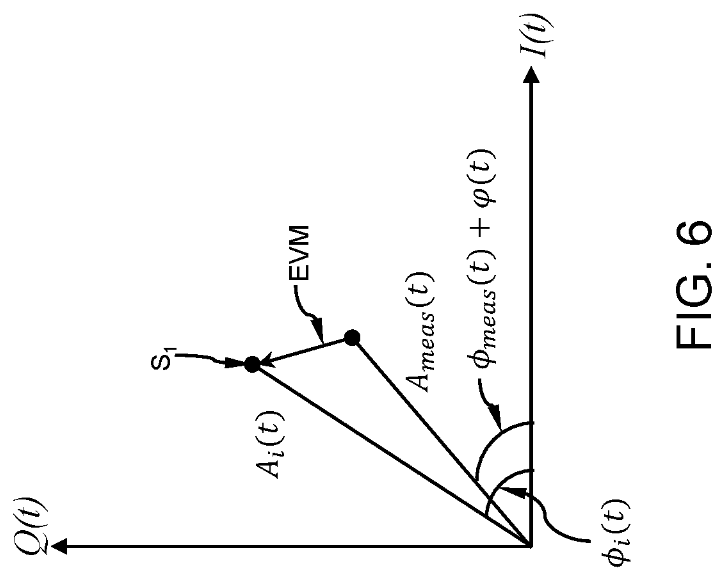
FIG. 6 is a signal-space diagram of a transmitted symbol and a corresponding received symbol generated according to the modulation scheme of FIG. 5.

FIG. 6 illustrates a phasor diagram of a transmitted symbol $R_{tx}(t)$ and a corresponding received symbol $R_{rx}(t)$ having amplitude and/or phase errors as well as additional phase delay $\varphi(t)$. The received symbol is also referred to as a measured symbol, or a received modulated test signal.

The phasor of the transmitted symbol (generically designated as symbol i) has the form of:

$$R_{tx}(t) = A_i(t)e^{(j\phi_i(t)+j\varphi(t))}$$

Here, $A_i(t)$ is the signal-space amplitude modulation function applied by the DCA 20 and $\phi_i(t)$ is the signal-space phase modulation function applied by the phase shifter 22 corresponding to the $i^{th}$ symbol.

The received symbol phasor has the form:

$$R_{rx} = A_{meas}(t)e^{(j\phi_{meas}(t)+j\varphi(t))},$$

Here, $A_{meas}(t)$ is the received (i.e., measured) amplitude modulation function, and $\phi_{meas}(t)$ is the received (i.e., measured) phase modulation function. The phase $\phi_{meas}(t)$ includes multiple phase components, including the phase $\phi_i(t)$ and phase impairments/errors imparted by the DCA and phase shifter.

Figures 7, 8:
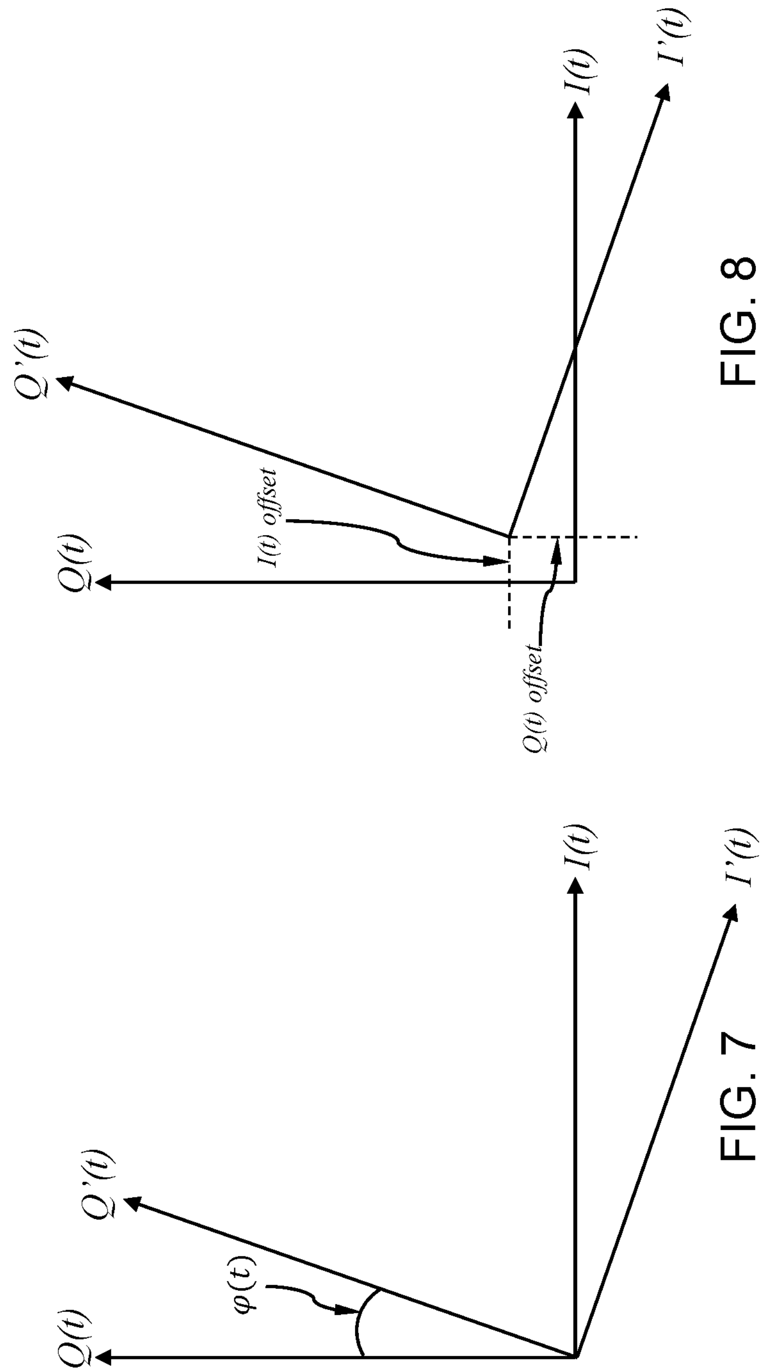
FIG. 7 is a signal-space diagram of the isolated phase delay associated with the received symbol of FIG. 6.
FIG. 8 is a signal-space diagram illustrating a DC offset associated with the received symbol of FIG. 6.

In order to determine the phase delay $\varphi(t)$, the DPU 32 (preferably the baseband processor 38) compares the received symbol phasor $R_{rx}(t)$ to the transmitted symbol phasor $R_{tx}(t)$. The comparison can include calculating an error vector magnitude (EVM). The measured phase with delay $\phi_{meas}(t)+\varphi(t)$ is compared to the correct phase $\phi_i(t)$ in order to determine the phase error, and the targeted constellation frame of reference is then compared against the measured constellation frame of reference (due to the phase delay $\varphi(t)$) so as to determine the value of the phase delay $\varphi(t)$. This process can be repeated for each amplitude-phase-state combination, i.e., for each symbol in the modulation constellation, in order to obtain a robust calculation of the phase delay $\varphi(t)$. FIG. 7 illustrates the isolated determined phase delay $\varphi(t)$ plotted in the same signal space as the phasor diagram of FIG. 6. As can be seen, the phase delay imparts a rotation of the I(t) and Q(t) axes, labeled as I'(t) and Q'(t), where the angle between the targeted constellation frame of reference (I(t) and Q(t)) and the measured constellation frame of reference (I'(t) and Q'(t)) is $\varphi(t)$.

A constant envelope modulation scheme, such as the circular modulation scheme illustrated in the FIG. 4, is shown herein to provide favorable results for separating the errors imparted by the DCA and phase shifter of an antenna channel. For instance, as briefly mentioned above, the symbol $S_0$ (located strictly on the I(t) axis) can be used as a reference symbol which represents pure amplitude modulation (zero phase state) for amplitude and phase accuracy. If there are l bits used for the DCA states, then there are $L=2^l$ reference symbols for each ring (amplitude level) of the constellation. If there are m bits used for the phase shifter states, then there are $M=2^m$ phase states for each ring. Accordingly, the phase errors and amplitude errors can be extracted from each symbol at a given constellation ring. These errors are the absolute calibration parameters of a particular antenna channel, and can be used in order to determine the calibration parameters for all of the antenna channels.

For example, using the symbol $S_0$ as a reference symbol, the phasor of the measured (i.e., received) reference symbol $S_0$, designated $R_{0\_meas\_1}(t)$ can be expressed as $$R_{0\_meas\_1}(t) = A_{0\_meas\_1}(t)e^{(j\phi_{0\_meas\_1}(t)+j\varphi(t))}$$

In the above expression, the subscript 0_meas_1 denotes the measurement (i.e., received) of the 0 symbol (i.e., reference symbol) at the constellation ring index 1. The measured reference symbol phasor $R_{0\_meas\_1}(t)$ is a complex number since it has a phase and amplitude error, while the transmitted reference symbol phasor (expressed as $R_{0\_ref}(t)$) is real number since it corresponds to the zero-phase state (i.e., pure amplitude modulation) as discussed above. Thus, the transmitted reference symbol phasor can be expressed as:

$$R_{0\_ref}(t) \equiv A_{0\_ref}(t)$$

Accordingly, the magnitude, $|R_{0\_meas\_1}(t)|$, of the measured reference symbol is the amplitude $A_{0\_meas\_1}(t)$, and the ratio of the amplitude $A_{0\_meas\_1}(t)$ against the magnitude, $|R_{0\_ref}(t)|$, of the transmitted reference symbol is the amplitude error. This amplitude error, measured in decibels (dB), can be expressed as:

$$\delta_0 = 20\log_{10}\left(\frac{|R_{i\_meas\_1}(t)|}{|R_{0\_ref}(t)|}\right) = 20\log_{10}\left(\frac{|A_{0\_meas\_1}(t)|}{|A_{0\_ref}(t)|}\right)$$

The phase of the measured reference symbol phasor $R_{0\_meas\_1}(t)$ (measured with respect to the I(t) axis) is the phase error, and can be expressed as:

$$\theta_0 = \arg(R_{0\_meas\_1}(t)) = \phi_{0\_meas\_1}(t) + \varphi(t)$$

Once the amplitude and phase errors for the reference symbol are calculated (by the DPU 32, and preferably by the baseband processor 38), the DPU 32 calculates the amplitude and phase errors of all of the received symbols in the same constellation ring as the reference symbol but with different phase states. In other words, the DPU 32 calculates the amplitude and phase errors for each symbol that has the same DCA state as the reference symbol but in which each symbol has a different respective phase state selected from the M possible phase states.

The symbol corresponding to the $i^{th}$ phase state of the M possible phase states in the constellation ring is denoted by the subscript i_meas_1, and thus the phasor of the measured symbol corresponding to phase state i and having the same DCA state as the reference symbol can be expressed as:

$$R_{i\_meas\_1}(t) = A_{i\_meas\_1}(t)e^{(j\phi_{i\_meas\_1}(t)+j\varphi_{i\_meas\_1}(t))}$$

The errors for this symbol include amplitude errors which include errors imparted by the DCA and the phase shifter, and phase errors imparted by the phase shifter. These errors are preferably measured against the amplitude and phase of the transmitted symbol corresponding to the $i^{th}$ phase state in order to produce a global amplitude error and phase error. The global amplitude and phase error of the symbol can be compared to the amplitude and phase error of the reference symbol (discussed above) in order to extract the amplitude and phase errors when the phase shifter varies the current phase of the test signal to assume the $i^{th}$ phase state.

As an example, the amplitude error (in dB) for the symbol corresponding the $i^{th}$ phase state is the log-ratio between the magnitude, $|R_{i\_meas\_1}(t)|$, of the measured symbol and the magnitude, $|R_{0\_ref}(t)|$, of the transmitted reference symbol. This amplitude error can be expressed as:

$$\delta_i = 20\log_{10}\left(\frac{|R_{i\_meas\_1}(t)|}{|R_{0\_ref}(t)|}\right)$$

The relative amplitude error of this symbol measured against the amplitude error of the reference symbol can be expressed as:

$$\delta_{i\_0} = 20\log_{10}\left(\frac{|R_{i\_meas\_1}(t)|}{|R_{0\_ref}(t)|} / \frac{|R_{0\_meas\_1}(t)|}{|R_{0\_ref}(t)|}\right) = 20\log_{10}\left(\frac{|R_{i\_meas\_1}(t)|}{|R_{0\_meas\_1}(t)|}\right)$$

It is important to note that the common amplitude error $|R_{0\_ref}(t)|$ is present in the numerator and denominator of the above expression, and thus drops out.

A similar approach can be applied in order to calculate, for this symbol, the relative phase error imparted by the phase shifter when the phase shifter varies the current phase of the test signal to assume the $i^{th}$ phase state. The relative phase error can be expressed as:

$$\theta_{i\_0} = \frac{\arg(R_{i\_meas\_1}(t))}{\arg(R_{0\_meas\_1}(t))} = \frac{\arg\left(e^{(j\phi_{i\_meas\_1}(t)+j\varphi(t))}\right)}{\arg\left(e^{(j\phi_{0\_meas\_1}(t)+j\varphi(t))}\right)}$$

It is noted that the phase delay $\varphi(t)$ is present in both numerator and denominator of the above expression, and thus drops out. Thus, the expression for the relative phase error can be simplifies as:

$$\theta_{i\_0} = \phi_{i_{meas_1}}(t) - \phi_{0\_meas\_1}(t)$$

As previously mentioned, the error calculation process is preferably repeated for each of the antenna channels, and the errors are preferably measured relative to a reference antenna channel. By way of one non-limiting example, for each antenna channel, each respective symbol representing a respective one of the amplitude-phase-state combinations is compared to the respective symbol of the reference antenna channel representing the same respective amplitude-phase-state combination. This comparison can be performed on a symbol-by-symbol basis. For example, if the modulation constellation includes $P=2^{l+m}$ symbols indexed p=1, 2, . . . , P (where each symbol index corresponds to a different amplitude-phase-state combination of the possible P combinations), and the antenna assembly 12 includes N antenna channels indexed n=1, 2, . . . , N (where n=1 is the reference antenna channel), and symbol $$S_n^p$$

denotes the symbol corresponding to the $p^{th}$ amplitude-phase-state for the $n^{th}$ antenna channel, the symbol-bysymbol comparison can be performed by setting n= 2 and comparing $$S_n^p$$

to $$S_1^p$$

(symbol-by-symbol), and then incrementing n repeating the comparison process until reaching n=N.

It is noted that each ring of the constellation has a corresponding reference symbol, thus if there are Z rings, then there will be Z reference symbols (one per ring). The above-mentioned steps for calculating the amplitude and phase errors were provided within the example context of being applied to the first ring (ring index 1), however it should be understood that similar steps can be applied for each ring of the constellation. In general, for the $z^{th}$ ring, the relative amplitude error of the $i^{th}$ symbol measured against the amplitude error of the reference symbol can be expressed as:

$$\delta_{i\_0}^{z} = 20\log_{10}\left(\frac{|R_{i\_meas\_z}(t)|}{|R_{0\_meas\_z}(t)|}\right),$$

where the subscript 0_meas_z denotes the measurement of the reference symbol of the $z^{th}$ ring, and i_meas_z denotes the measurement of the $i^{th}$ symbol of the $z^{th}$ ring.

Similarly, the relative phase error of the $i^{th}$ symbol measured against the phase error of the reference symbol, for the $z^{th}$ ring, can be expressed as:

$$\theta_{i\_0}^{Z} = \phi_{i\_meas\_z}(t) - \phi_{0\_meas\_z}(t)$$

It is noted that various techniques can be used for extracting the aforementioned amplitude and phase errors ash should be understood by those of ordinary skill in the art. Such techniques include, for example, least mean squares (LMS), minimum mean square error (MMSE), minimum bounding box, and the like.

Parenthetically, the received modulated test signal still includes leakage signal. In the constellation diagram, the leakage signal is manifested as a complex DC offset with both I and Q components. The DC offset does not generate additional rotation of the received symbol phasors (such as in the case of the phase delay φ(t)), but does contribute to symbol phase error, since the DC offset affects the projection of the received symbol on the I(t) and Q(t) axes. FIG. 8 shows the result of the DC offset (prior to rotation of the constellation to account for the phase delay). Techniques for correcting DC offset that are present in received symbols of modulation constellations are well-known in the art of digital communications. In one example technique, a DC voltage is applied in the opposite direction for each I and Q axis projection. For example, a dedicated DAC can be connected along the I path, and a dedicated DAC can be connected along the Q path. A correction voltage is then applied to reduce the DC offset voltage or the carrier leakage. At the DPU 32, antipodal values are applied to the I and Q samples (provided by the dedicated DACs) in order to cancel the offsets along the I and Q axes. This process can be iterative, in which residual offsets are cancelled by re-sampling (using the dedicated DACs) and cancelling by applying antipodal values. In another example technique, a baseband DC notch filter can be implemented as a digital filter in the DPU 32, for example at the baseband processor 38.

The DPU 32 can actuate the DCA and phase shifter of each antenna channel to apply an amplitude and phase correction based on the calculated amplitude and phase errors in order to offset the errors imparted by the DCAs 20*a*, 20*b* and 20*c* and phase shifters 22*a*, 22*b* and 22N. In certain embodiments, the calibration procedure steps of injecting and modulating the test signal can be repeated multiple times in order to correct for any residual amplitude and phase errors imparted by the DCAs 20*a*, 20*b* and 20*c* and phase shifters 22*a*, 22*b* and 22N. It is noted that in the preferred embodiments employing digital modulation schemes in which sequences of bits are mapped/encoded to symbols representing amplitude-phase-state combinations, the DPU 32 can calculate a symbol-error-rate (SER) and/or bit-error-rate (BER) for the received symbols, which can be used as a figure of merit to assess the quality of the calibration procedure.

Figure 9:
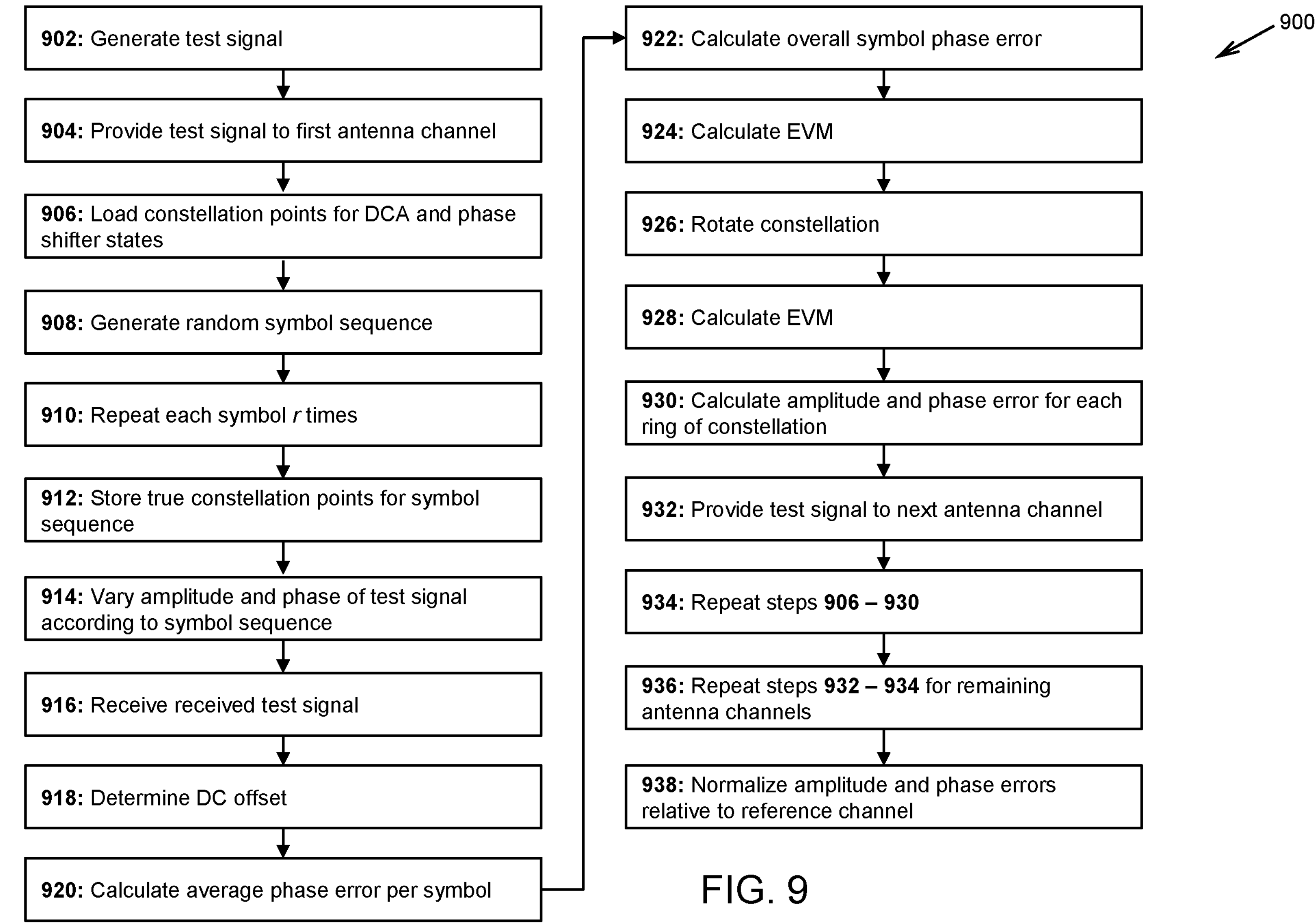
FIG. 9 is a flow diagram illustrating a process for calibrating components of the phased-array antenna of FIG. 1 using the exemplary modulation scheme of FIG. 5, according to embodiments of the present disclosure.

Attention is now directed to FIG. 9, which shows a flow diagram detailing a process (i.e., a method) 900 for performing calibration of the components of each antenna channel 14*a*, 14*b* and 14N of the antenna assembly 12 according to embodiments of the present disclosure. Reference is also made to FIGS. 1-8. It is noted that the process 900 is described within the context of a particularly preferred but non-limiting implementation employing a digital modulation scheme for generating the modulated test signal for each antenna channel, and in particular a modulation scheme having a circular modulation constellation (such as that of FIG. 5). The process 900 and its sub-processes are performed the DPU 32, the transceiver unit 26, the antenna assembly 12, and their associated components, and are performed automatically and preferably in real-time.

The process 900 begins at step 902, where the test signal 60 is generated. In the non-limiting example architecture of the device 10 illustrates in FIGS. 1-3, the baseband processor 38 generates a digital test signal and provides the digital test signal to the DAC 34, which is converts the digital test signal to an analog test signal. The DAC 34 provides the analog test signal to the Tx module 28, which up-converts the analog test signal to RF so as to generate the test signal 60. At step 904, the RF test signal 60 is provided to at least one antenna channel signal path via the test signal line 54 and at least one of the electro-magnetic couplings 56*a*, 56*b* and 56N. In certain embodiments, the RF test signal 60 is provided to one selected antenna channel at a time, and the corresponding received test signal is processed to determine amplitude and phase errors. As will be discussed, once the test signal 60 has been provided to (sequentially) to each of the antenna channels, and the received test signal is processed for each of the antenna channels in order to calculate the amplitude and phase errors, one of the antenna channels is selected as a reference channel and the amplitude and phase errors of the remaining antenna channels are normalized relative to the amplitude and phase errors of the reference antenna channel.

When utilizing a digital modulation scheme, the DPU 32 at step 906 loads (for example from memory 42) the total number of constellation symbol points that represent the total possible amplitude-phase-state combinations. As discussed above, if there are 1 bits used to represent the amplitude state, and m bits used to represent the phase state, then the constellation order (i.e., the number of points, i.e., the size of the symbol alphabet) is given as $P=L\times M=2^{l+m}$. Note that step 906 may be performed prior to step 902, or steps 902 and 906 may be performed contemporaneously as part of a calibration process initialization step.

At step 908, the DPU 32 generates a random sequence of symbols (each symbol selected from the symbol alphabet specified at step 906). Preferably, the sequence is such that each symbol in the alphabet appears exactly once in the sequence. Thus, the symbol sequence length is preferably equal to the constellation order P. At step 910, the DPU 32 preferably repeats each symbol (in the sequence generated at step 908) r times, such that the total symbol sequence length U is as follows: $U=r\times P$. Preferably, $r>1$ and is sufficiently large to enable averaging of the calculated errors for each set of repeated symbols, thereby increasing calibration performance.

At step 912, the true (i.e., noise and error free) constellation points for the sequence of symbols (generated at steps 908, 910) are stored in a memory associated with the baseband processor 38, such as a memory of the baseband processor 38 or a memory external to the baseband processor 38 that is part of the DPU 32 such as the memory 42. The true constellation points, referred to as a "reference constellation", are used by the baseband processor 38 to determine errors in received symbols. As part of this step, the average phase of each symbol in the reference constellation can also be computed by the DPU 32 to produce a reference average phase for each symbol.

At step 914, the DPU 32 (and in certain preferred implementations the controller 40), applies the generated symbol sequence by actuating the DCA 20 and the phase shifter 22 of the antenna channel 14 to vary the current amplitude and the current phase of the test signal 60 between the amplitude and phase states corresponding to the symbol sequence, thus generating a modulated test signal in accordance with the symbol sequence. It is noted that the modulated test signal can be a continuous signal having multiple non-overlapping segments (in time) in which each segment of the signal corresponds to a different respective symbol in the symbol sequence. Thus, each segment can be generated according to a set of bits (per the number of bits used for the DCA states and phase shifter states).

At step 916, the DPU 32 receives a received test signal 64 via the selected antenna channel of the antenna assembly 12 and the transceiver unit 26. The received test signal 64 includes multiple signal components, including the modulated test signal generated by transmission through the selected antenna channel, and the leakage signal 62. The modulated test signal is generated in accordance with the symbol sequence generated at step 910. The received test signal 64 includes "measured" symbols, which are the transmitted symbols obscured by the amplitude and phase errors, as well as phase delays and DC offset (imparted by the leakage signal 62). Prior to reaching the DPU 32, the received test signal 64 is down-converted from RF to IF or analog baseband by the Rx module 30. The IF or analog baseband signal is digitized by the ADC 36 to generate sampled symbols, and these sampled symbols are fed to the baseband processor 38 for processing.

At step 918, the DPU 32 processes the sampled symbols of the received test signal 64 to determine the DC offset imparted by the leakage signal 62 on the measured symbols, and performs DC offset calibration to set the origin of the constellation of the measured symbols to the center/origin of the reference (true) constellation. As discussed above, DC offset calibration techniques are well-known in the art, and include, for example, applying a DC voltage in the opposite direction of the I and Q offset components for each I and Q axis projections, and using a digital DC notch filter in the DPU 32.

At step 920, the DPU 32 calculates the average phase error of each DC offset corrected measured symbol with respect to the symbols of the reference constellation (from step 912). Second order statistics, e.g., variance, of the phase error can also be computed by the DPU 32. At step 922, the DPU 32 averages together the average phase errors of the symbols to compute an overall symbol phase error. The computed overall symbol phase error is the phase error attributed to the phase delay $\varphi(t)$ (FIGS. 5 and 6). At step 924, the DPU 32 compares each of the measured symbols (from step 916) with the symbols of the reference constellation (step 912) to calculate phase and amplitude errors for each symbol. The DPU 32 may perform the comparison by calculating EVM.

At step 926, the DPU 32 applies a constellation rotation correction by rotating the constellation by an angle in accordance with the overall phase error computed in step 922 (i.e., to remove the phase delay $\varphi(t)$), thereby producing a set of phase-rotated symbols. At step 928, the DPU 32 compares each of the phase-rotated symbols with the symbols of the reference constellation (step 912), for example by calculating EVM. Steps 922, 926 and 928 are preferably repeated until the EVM is minimized, thus resulting in the optimal phase rotation. Once the constellation is rotated by the optimal phase amount, the process 900 proceeds to step 930.

At step 930, the amplitude and phase errors of the symbols of the optimally rotated constellation are obtained for all of the rings of the constellation. First, the reference symbol for the first indexed ring of the optimally rotated constellation is selected. The reference symbol is selected as the symbol on the positive side of the I(t) axis of the constellation (i.e., the symbol on the positive-real axis). This symbol corresponds to when the DCA is at a 0 dB attenuation state and the phase shifter is at the zero-phase-state. The computed amplitude error is stored as the DCA amplitude error at the 0 dB attenuation state, and the computed phase error is stored as the DCA phase error at the 0 dB attenuation state. Next, the symbol corresponding to the next phase shifter state with the same DCA state as the reference symbol is selected. The amplitude and phase errors of this selected symbol are obtained and the absolute phase error imparted by the phase shifter at instant phase state are extracted. This is repeated for the remaining symbols corresponding to the remaining phase states having the same DCA state as the reference symbol of the first indexed ring, such that the absolute phase error imparted by the phase shifter at the remaining phase states for the first indexed ring (DCA at the 0 dB attenuation state) are extracted. Next, the symbol corresponding to when the DCA is in the next state (next indexed ring) and the phase shifter is in the zero-phase state is selected. The computed amplitude error is stored as the DCA amplitude error at the next state, and the computed phase error is stored as the DCA phase error at the next state. Similar to as before, the symbols corresponding to the remaining phase states having the same DCA state as the reference symbol of the next indexed ring are sequentially selected, and the absolute phase error imparted by the phase shifter at the remaining phase states for the next indexed ring are extracted. This is repeated for all of the rings of the constellation until all symbols of the generated modulation constellation are represented. Preferably, the amplitude and phase errors of all of the rings are normalized with respect to the amplitude and phase errors of the first indexed ring.

The process 900 then moves to step 932, where the test signal 60 is provided to a next selected antenna channel. Then, at step 934, steps 906-930 described above are repeated for the next selected antenna channel so as to obtain the amplitude and phase errors imparted by the DCA and phase shifter of the selected antenna channel. At step 936, steps 932 and 934 are repeated for the remaining antenna channels until the amplitude and phase errors imparted by the DCA and phase shifter of each of the antenna channels 14*a*, 14*b* and 14N is obtained. Finally, at step 938, the relative errors are calculated by normalizing the amplitude and phase errors of each antenna channel relative to a selected reference antenna channel. Alternatively, as mentioned above, the relative errors can be computed by comparing symbol-by-symbol the errors associated with a symbol of a particular antenna channel with the errors associated with the corresponding symbol of the reference antenna channel.

It is noted that steps 918-928 pertain to removing the DC offset and constellation rotation errors induced by the leakage signal and the phase delay. However, these steps are not explicitly necessary in order to perform the calibration procedures for determining amplitude and phase errors associated with the DCAs and phase shifters. Therefore, implementations are considered in which the amplitude and phase error determination at step 930 is applied to the raw measured symbols without rotation correction or DC offset correction.

The calibration procedure may be particularly effective when the test signal is sequentially provided to the antenna channels, as alluded to above in the non-limiting implementation of the process 900 described above. In particular, the test signal may first be provided to a designated reference antenna channel and the received test signal can be processed in order to determine amplitude and phase errors associated with the modulated test signal produced by the DCA and phase shifter of the reference antenna channel. Then the test signal can be provided to the remaining antenna channels (in sequence), and the received test signal can be processed in order to determine amplitude and phase errors associated with the modulated test signal produced by the DCA and phase shifter of the remaining antenna channels. It is noted, however, that techniques can be employed which enable the test signal to the be provided to all or some of the antenna channels in parallel/simultaneously and enable identification of the modulated test signal of each antenna channel in the received test signal.

In one non-limiting implementation, the parallel processing is enabled by use of a sequence of orthogonal spreading codes, such as pseudo-noise (PN) sequences generated by linear feedback shift registers (LFSR). Such sequences are also known as LFSR sequences or m-sequences, and are used extensively in spread spectrum communication systems, such as code division multiple access (CDMA) systems, frequency hopped spread spectrum (FHSS), and the like. The DPU 32 can generate a set of unique spreading codes and can command/control the core-chip of each antenna channel to apply a different respective one of the spreading codes to the test signal after modulation by the DCA and phase shifter. Thus, each antenna channel outputs a spread and modulated test signal. The outputs of the antenna channels are combined, for example via the power combiner 24, so as to produce a single output signal having multiple signal components including the spread and modulated test signal of each antenna channel. The DPU 32 performs de-spreading in order to isolate the modulated test signal for each antenna channel. For example, if there are N antenna channels, N orthogonal spreading codes can be used, where $C_n$ is the spreading code applied by the core-chip of the $n^{th}$ antenna channel. In order to isolate the modulated test signal of the $n^{th}$ antenna channel, the DPU 32 can apply the code $C_n$ to the received test signal (via, for example, auto-correlation processing) to isolate the modulated test signal of the $n^{th}$ antenna channel.

Other techniques that enable parallel processing are also contemplated herein, including, for example, time division duplexing schemes and frequency division duplexing schemes.

Although the embodiments described thus far have pertained to digital modulation schemes for coloring the test signal by using the DCAs and the phase shifters to vary the amplitude and phase of the test signals between a plurality of amplitude and phase states, other embodiments that rely on analog modulation and spectral analysis of the modulation are also considered herein.

By way of introduction, and as should be apparent to those of skill in the art, toggling a phase shifter between phase states, i.e., from one phase state to another phase state, at a given rate results in analog frequency modulation (FM). In the frequency domain, FM sidebands can be observed according to the phase deviation and rate of FM modulation (phase shifter toggling rate). Similarly, toggling a DCA between amplitude/attenuation states, i.e., from one attenuation state to another attenuation state, at a given rate results in analog amplitude modulation (AM). In the frequency domain, AM sidebands can be observed according to the attenuation state and rate of AM modulation (DCA toggling rate).

As is known in the art, FM signals are represented by a Bessel function, and the modulated signal can be expressed as:

$$x_{c\_FM}(t) = A_c \sum_{n=-\infty}^{\infty} J_n(\beta)\cos((\omega_c + n\omega_m)t)$$

Here, $A_c$ is the carrier amplitude, $\omega_c$ is the carrier frequency, $\omega_m$ is the modulating frequency, n is an integer representing sideband order, $\beta$ is the modulation index, and $J_n(\beta)$ is a Bessel function of the first kind as a function of sideband order and modulation index. Bessel functions of the first kind have the following property:

$$J_{-n}(\beta) = (-1)^n J_n(\beta)$$

Thus, the phase of the negative odd integers of the FM signal is opposite of the positive integers thus as an example $J_{-1}(\beta)=-J_1(\beta)$.

AM signals can be expressed as:

$$x_{c\_AM}(t) = A_c\cos(\omega_c t) + \frac{A_c A_m}{2}\cos((\omega_c + \omega_m)t) + \frac{A_c A_m}{2}\cos((\omega_c - \omega_m)t)$$

Here, $A_m$ is the message signal amplitude.

Since for each antenna channel the DCA has an associated phase error and the phase shifter has an associated amplitude error, the FM modulation induced by toggling the phase shifter has residual AM signal effects, and the AM modulation induced by toggling the DCA has residual FM signal effects. Thus, if the AM and FM signal sidebands are frequency equal, i.e., if $\cos((\omega_c+\omega_m)t)=\cos((\omega_c+n\omega_m)t)$, where the left hand side of the expression is the AM side band and right hand side of the expression is for FM and there is a case of n=1 as an example, then the error $J_1(\beta)$ is extracted from the DCA AM signal, and the error $$\frac{A_c A_m}{2}$$

is extracted from the phase shifter FM signal. The error extraction is due to the fact that $J_{-1}(\beta)$ affects the AM modulation lower sideband differently from the higher sideband. The difference between the magnitude of the lower and higher sidebands is $2J_1(\beta)$, and the sum of the lower and higher sidebands magnitudes is $$2\times\frac{A_c A_m}{2}=A_c A_m.$$

Furthermore, if $$\frac{A_c A_m}{2}=J_1(\beta)$$

then the low side band of $x_{c\_AM}(t)+x_{c\_AM}(t)=0$. Thus, the residual AM effects resultant from toggling the phase shifter and FM effects resultant from toggling the DCA can be isolated. The DPU 32 can be programmed to compare the residual AM and FM effects to a reference baseband signal in order to extract the amplitude and phase errors imparted by the DCA and phase shifter, respectively.

It is noted that if the amplitude changes imparted by toggling the DCA results in AM sidebands that are not equal to FM sidebands resultant from phase changes imparted by toggling the phase shifters, then $\cos((\omega_c+\omega_m)t)\neq\cos((\omega_c+n\omega_m)t)$. Thus, the AM and FM sidebands do not affect or interfere with each other, and are side by side. This is even an advantage that simplifies the isolation of errors imparted by the DCA and PS.

Within the context of this document, toggling a phase shifter between a plurality of phase states at a given rate refers to the act of actuating/controlling (e.g., via controller 40) the phase shifter to vary the phase of an incoming signal (e.g., the test signal when the device 10 is in calibration mode, or an RF signal for transmission by the antenna elements 16*a*, 16*b* and 16N or reception by the antenna elements 16*a*, 16*b* and 16N when the device 10 is in operational mode) at a given rate between the plurality of phase states. Furthermore, when a phase shifter is said to be in a given phase state, the implication is that the phase shifter applies a phase shift to the phase of the incoming signal commensurate to the phase state. Similarly, toggling a DCA between a plurality of amplitude/attenuation states at a given rate refers to the act of actuating/controlling (e.g., via controller 40) the DCA to vary the amplitude of an incoming signal at a given rate between the plurality of amplitude/attenuation states. Furthermore, when a DCA is said to be in a given amplitude/attenuation state, the implication is that the DCA applies an amplitude adjustment to the amplitude of the incoming signal commensurate to the amplitude/attenuation state.

It is noted that the DPU 32 is preferably configured to apply amplitude and phase corrections, based on the amplitude and phase errors associated with the DCA and phase shifter of each antenna channel determined during calibration (e.g., the errors determined by the execution of the process 900), to the amplitude and phase states associated with the DCA and phase shifter. In this way, the amplitude and phase errors imparted by the DCA and phase adjustor—that are determined during the part of the calibration procedure described, for example, with reference to FIG. 9—are calibrated out, such that when the device 10 operates in operational mode the current amplitude and phase of the transmitted/received RF signal is adjusted by the DCA and phase shifter of each antenna channel to assume an appropriate amplitude state and an appropriate phase state without (or with minimal) amplitude and phase error. Thus, when the device 10 operates in operational mode the amplitude and phase shifted signals coherently combine. When the device 10 receives RF signals, the phase shifts applied to the received RF signal by the phase shifter of each antenna channel compensate for the difference in time of arrival of the RF signal at the antenna element(s) of each channel (which depends upon the angle of incidence of the received RF signal wavefront and the spacing between the antenna elements), and the phase shifted signals are combined (via combiner 24) such that the combined signals are coherently combined so as to enhance the reception from the desired direction commensurate with the phase shifts.

In certain embodiments, the amplitude and phase errors associated with the DCA and phase shifter of each antenna channel, calculated during the calibration procedure, can be stored in a memory of the device 10, e.g., the memory 42 of the DPU 32, and can later be uploaded to the core-chip of each antenna channel in order to provide the requisite amplitude and phase correction.

As mentioned above, in certain preferred embodiments, the amplifier circuit, DCA, and phase shifter of each antenna channel are implemented within a single core-chip. In certain non-limiting implementations, each core-chip can include a transmit/receive (T/R) module that provides a switchable transmit and receive path transceiver phased-array wireless devices, such as the device 10-2 of FIG. 12. For example, and as will be described below, when the device 10-2 operates in calibration mode, the T/R module of each antenna channel can be controlled to provide the requisite transmit/receive path for the test signal. Such implementations are used in active electronically scanned arrays.

The calibration procedure according to the embodiments of the present disclosure has been described within the non-limiting exemplary context of a wireless device configured as a receiver (e.g., device 10), and wherein a test signal is injected via a test signal line that passes through a transmit port (e.g., the Tx module of the RF unit) and is electromagnetically coupled to each receive antenna channel so as to return via the DCA and phase shifter of the antenna channel, and is received via a receive port (e.g., the Rx module of the RF unit) which provides the received test signal to the DPU for processing. As previously mentioned, and as should be clear to those of skill in the art, the modulation ("coloring") techniques of the calibration procedure described herein are equally applicable to transmit phased-array wireless devices and transceiver phased-array wireless devices as well, such as the non-limiting exemplary devices 10-1, 10-2 and 10-3. The application of the calibration methods, that utilize the modulation/coloring techniques described above within the context of receive phased-array devices, to devices having transmit and/or transceiver phased-array should be clear from the description herein.

With accompanying reference to FIGS. 10-13, the following paragraphs describe the structure and operation of the device 10-1 (having a transmit phased-array) and the devices 10-2 and 10-3 (having transceiver phased-arrays). Key differences between the devices 10, 10-1, 10-2, and 10-3 when operating in calibration mode and operational mode will become apparent in this description.

Looking first at FIGS. 10 and 11, the device 10-1 is generally similar to the device 10 with the notable exception that the device 10-1 is configured as a transmitter. Here, the antenna assembly 12 is a transmit phased-array, where each of the antenna elements 16*a*, 16*b* and 16N is operable to transmit RF signals across a frequency band. The frequency band may span across portions of one or more sub-bands of the radio spectrum, including, for example, the high frequency (HF) band (covering frequencies in the range of 3-30 MHz), the very high frequency (VHF) band (covering frequencies in the range of 30-300 MHz), the ultra-high frequency (UHF) band (covering frequencies in the range of 300-3000 MHz), the super high frequency (SHF) band (covering frequencies in the range of 3-30 GHz), and the extremely high frequency (EHF) band (covering frequencies in the range of 30-300 GHz.

When the device 10 transmits RF signals, the effective radiation field at the output of the antenna elements 16*a*, 16*b* and 16N has directionality commensurate with the phase shifts applied by the phase shifters, thereby producing a radiation beam pattern with a large main lobe in the desired direction and minimal sidelobes.

Similar to as in the device 10 as described above with reference to FIGS. 1 and 2, in calibration mode the baseband processor 38 is configured to generate a digital test signal which is converted to an analog signal by the DAC 34 and up-converted by the Tx module 28. However, in the present example, the up-converted RF test signal is provided to a splitter 25 which distributes the test signal to the individual antenna channels 14*a*, 14*b* and 14N. Each of the antenna channels 14*a*, 14*b* and 14N includes a transmission path defined by the phase shifter, amplitude adjustor circuit, and amplifier circuit of the antenna channel. The test signal line 54 is coupled to the output of amplifier circuits 19*a*, 19*b* and 19N (preferably implemented here as medium power amplifiers) via respective electro-magnetic couplings 56*a*, 56*b* and 56N. Similar to as described with reference to FIG. 2, the digitized loop-back signal 64 (which is produced by digitizing—via the ADC 36—the down-converted signal produced by the Rx module 30) includes modulated test signal components (modulated by the PS and DCA of the antenna channels) as well as the leakage signal 62.

When the device 10-1 operates in operational mode, the baseband processor 38 is configured to perform transmission-related functions to generate digital signals to be transmitted via the antenna assembly 12. These functions may include, but are not limited to, bit-to-symbol mapping, source encoding (i.e., data compression), forward error correction encoding, digital modulation, and the like. Furthermore, when the device 10-1 operates in operational mode, the DAC 34 is configured to convert the digital signals generated by the baseband processor 38 to analog IF or analog baseband signals, and the Tx module 28 is configured to up-convert the IF or analog baseband signals to RF, thus producing RF signals and providing those RF signals to the splitter 25 for distribution to the antenna channels 14*a*, 14*b* and 14N and for transmission by the antenna elements 16*a*, 16*b* and 16N.

Turning now to FIG. 12, there is illustrated a device 10-2 configured as a transceiver. In general, the device 10-2 incorporates the features of the devices 10 and 10-1 into a single device, and uses a time division duplexing (TDD) switching scheme to switch between signal transmission and signal reception configurations/states when operating in operational mode. As can be seen, the antenna channels 14*a*, 14*b* and 14N includes pairs of amplifier circuits 18*a* and 19*a*, 18*b* and 19*b*, and 18N and 19N that are used depending on the state of the device 10-2 as a transmitter or as a receiver. Specifically, when the device 10-2 is configured as a receiver, amplifier circuits 18*a*, 18*b* and 18N (preferably implemented as LNAs) are used, whereas when the device 10-2 is configured as a transmitter, amplifier circuits 19*a*, 19*b* and 19N (preferably implemented as medium power amplifiers) are used. Pairs of switches 21*a* and 23*a*, 21*b* and 23*b*, and 21N and 23N are used to switch between receiver and transmitter configurations. The switches 21*a*, 21*b* and 21N can be switchably connected to connection ports 21*a*1/21*a*2, 21*b*1/21*b*2 and 21N1/21N2. The connection ports 21*a*1, 21*b*1 and 21N1 are connected to the output of the respective amplifiers 18*a*, 18*b* and 18N, and the connection ports 21*a*2, 21*b*2 and 21N2 are connected to the input of the respective amplifiers 19*a*, 19*b* and 19N. Similarly, the switches 23*a*, 23*b* and 23N can be switchably connected to connection ports 23*a*1/23*a*2, 23*b*1/23*b*2 and 23N1/23N2. The connection ports 23*a*1, 23*b*1 and 23N1 are connected to the input of the respective amplifiers 18*a*, 18*b* and 18N, and the connection ports 23*a*2, 23*b*2 and 23N2 are connected to the output of the respective amplifiers 19*a*, 19*b* and 19N.

Each pair of switches and connectable ports forms part of a T/R module of the antenna channel, e.g., the switches 21*a*, 23*a* and the ports 21*a*1, 21*a*2, 23*a*1, 23*a*2 form part of a T/R module of the antenna channel 14*a*. Each T/R module provides a switchable transmission/reception path defined by an amplifier circuit, amplitude adjustor circuit, and phase adjustor circuit of the antenna channel. For example, the reception path of the antenna channel 14*a* is defined by the amplifier 18*a*, the DCA 20*a*, and the PS 22*a*, and the transmission path of the antenna channel 14*a* is defined by the PS 22*a*, the DCA 20*a*, and the amplifier 19*a*.

In addition, a routing unit 80 is deployed between the RF unit 26 and the antenna assembly 12. The routing unit 80 includes switches 81, 83, 85, 87 that can each be switchably connected to corresponding connection ports depending on the configuration of the device 10-2 as a transmitter or receiver, and depending on operation of the device 10-2 in calibration mode or operational mode. Specifically, the switch 81 can be switchably connected to the connection ports 81*a*1 and 81*a*2, the switch 83 can be switchably connected to the connection ports 83*a*1 and 83*a*2, the switch 85 can be switchably connected to the connection ports 85*a*1 and 85*a*2, and the switch 87 can be switchably connected to the connection ports 87*a*1 and 87*a*2.

The device 10-2 is switched between transmitter and receiver configurations according to a time division duplexing (TDD) scheme. By employing TDD, the antenna elements 16*a*, 16*b* and 16N can operate to capture RF signals across a common wide frequency band. Alternatively, each of the antenna elements can be operate to capture RF signals across different frequency bands. The TDD scheme is managed by the DPU 32 and its components, for example the controller 40. The DPU 32 can provide control signals to the antenna assembly 12 to control switching of the switches of the antenna channels via the control line 46. Similarly, the DPU 32 can provide control signals to the routing unit 80 to control switching of the switches of the routing unit via control line 53.

The table below provides the switch states of the switches of the routing unit 80 and the antenna channels 14*a*, 14*b* and 14N when the device 10-2 operates as: 1) a transmitter in operational mode (referred to as Tx mode), 2) a transmitter in calibration mode (referred to as Tx-BIST mode), 3) a receiver in operational mode (referred to as Rx mode), and 4) a receiver in calibration mode (referred to as Rx-BIST mode). For each switch, the table entry for the switch indicates the connection port to which the switch is connected. For example, an entry of 81*a*1 for switch 81 indicates that the switch 81 is connected to connection port 81*a*1. Entries of NONE indicate that the switch is in an intermediate state in which the particular switch is not connected to either of the corresponding connection ports. It is also noted that only the switch states of the switches 21*a* and 23*a* are referenced in the table below, but it should be apparent that the switches of the other antenna channels follow similar switch states.

| # | Mode | 81 | 83 | 85 | 87 | 21a | 23a |
|---|---|---|---|---|---|---|---|
| 1 | Tx | 81a1 | 83a1 | NONE | NONE | 21a1 | 23a1 |
| 2 | Tx-BIST | 81a1 | 83a1 | 85a2 | 87a2 | 21a1 | 23a1 |
| 3 | Rx | NONE | 83a2 | 85a1 | NONE | 21a2 | 23a2 |
| 4 | Rx-BIST | 81a2 | 83a2 | 85a1 | 87a1 | 21a2 | 23a2 |

In FIG. 12, the switch states of the switches of the routing unit 80 and the antenna channels 14*a*, 14*b* and 14N show the device 10-2 as being in Tx mode.

FIG. 13 illustrates a schematic representation of another device 10-3 that is configured as a transceiver but that operates according to a frequency division duplexing (FDD) scheme, which allows the device 10-3 to simultaneously transmit and receive RF signals. Unlike the device 10-2, the antennas of the antenna assembly FDD device 10-3 are divided into a receive (Rx) antenna sub-assembly 12*a* and a transmit (Tx) antenna sub-assembly 12*b*. The Rx antenna sub-assembly 12*a* is generally similar to the antenna assembly 12 illustrated in FIG. 1, and the Tx antenna sub-assembly 12*b* is generally similar to the antenna assembly 12 illustrated in FIG. 10. In order to enable simultaneous transmission and reception, the antennas of the Rx antenna sub-assembly 12*a* are operative to receive RF signals across a first frequency band, and the antennas of the Tx antenna sub-assembly 12*b* are operative to transmit RF signals across a second frequency band that is non-overlapping with (and preferably sufficiently separated in frequency from) the first frequency band.

The antenna sub-assemblies 12*a*, 12*b* are coupled to respective RF units 26*a*, 26*b* that are generally similar to the RF unit 26 described above with reference to FIGS. 1, 2, 10, 11 and 12, i.e., they each include a Tx module and an Rx module for up-conversion and down-conversion. The device 10-3 further includes a routing unit 90 that includes switches 91, 93 that are switchably connected to respective connection ports 91*a*1/91*a*2 and 93*a*1/93*a*2. Port 91*a*1 is connected to the Tx module of the RF unit 26*a*, and port 93*a*1 is connected to the Rx module of the RF unit 26*a*. Port 91*a*2 is connected to the Tx module of the RF unit 26*b*, and port 93*a*2 is connected to the Rx module of the RF unit 26*b*. Although not shown in the drawing, test signal lines can be provided to each of the antenna sub-assemblies 12*a* and 12*b* (similar to as shown in FIGS. 1 and 10, respectively).

The device 10-3 can operate in the following modes: 1) operational Tx-Rx mode, 2) Tx-BIST mode, and 3) Rx-BIST mode.

To operate in operational Tx-Rx mode, the switch 91 is connected to port 91*a*2, and the switch 93 is connected to port 93*a*1. Here the DPU 32 generates signals for transmission, and those signals are routed to the Tx module of the RF unit 26*b* via the connection of the switch 91 to the port 91*a*2, which up-converts the signals to RF. The up-converted RF signals are then transmitted by the Tx sub-assembly 12*b*. Simultaneously, the Rx sub-assembly 12*a* receives RF signals and provides those received RF signals to the Rx module of the RF unit 26*a* which down-converts the RF signals. The down-converted signals are routed to the DPU 32 via the connection of the switch 93 to the port 93*a*1.

To operate in Tx-BIST mode, the switch 91 is connected to port 91*a*2, and the switch 93 is connected to port 93*a*2. Here, the DPU 32 generates a test signal that is routed to the Tx module of the RF unit 26*b* via the connection of the switch 91 to the port 91*a*2. The Tx module of the RF unit 26*b* up-converts the test signal to RF and injects RF test signal into the antenna channels of the Tx sub-assembly 12*b* via a test signal line (not shown). The loop-back signal is down-converted by the Rx module of the RF unit 26*b* and routed to the DPU 32 via the connection of the switch 93 to the port 93*a*2.

To operate in Rx-BIST mode, the switch 91 is connected to port 91*a*1, and the switch 93 is connected to port 93*a*1. Here, the DPU 32 generates a test signal that is routed to the Tx module of the RF unit 26*a* via the connection of the switch 91 to the port 91*a*1. The Tx module of the RF unit 26*a* up-converts the test signal to RF and injects RF test signal into the antenna channels of the Rx sub-assembly 12*a* via a test signal line (not shown). The loop-back signal is down-converted by the Rx module of the RF unit 26*a* and routed to the DPU 32 via the connection of the switch 93 to the port 93*a*1.

As should be apparent, when operating in operational mode the baseband processor of the DPU 32 of the devices 10-2 and 10-3 is configured to perform transmission-related functions to generate digital signals to be transmitted via the relevant antenna assembly or sub-assembly. These functions may include, but are not limited to, bit-to-symbol mapping, source encoding (i.e., data compression), forward error correction encoding, digital modulation, and the like. In addition, when operating in operational mode the baseband processor of the DPU 32 of the devices 10-2 and 10-3 is configured to perform reception-related functions to receive and process signals received from the relevant antenna assembly or sub-assembly. These functions may include, but are not limited to, symbol-to-bit de-mapping, digital filtering, equalization, source decoding (i.e., data decompression), forward error correction decoding, demodulation, and the like.

Although the embodiments described thus far have pertained to calibration procedures for a wireless device having an active phased-array antenna in which each antenna channel includes a DCA and a phase shifter whereby the antenna channels are calibrated by modulating the current amplitude and phase of an injected test signal via DCA and phase shifter control and processing received modulated test signals, the calibration methodology according to the embodiments of the present disclosure is also applicable to wireless devices having phased-array antennas having only phase shifters and no DCAs. In such embodiments, the injected test signal is modulated by varying (modulating) the current phase of the test signal between a plurality of phase states, and processing the received modulated test signal to determine amplitude and phase errors imparted by the phase shifter of each antenna channel.

As mentioned, the wireless devices according to the embodiments of the present disclosure can be used in any system that utilizes beamforming techniques in order to achieve directional signal transmission and/or reception, and by way of non-limiting example is of particular value when used as part of a wireless communications system, EW system, radar system, or DF system. When used as part of a wireless communication system, a wireless device according to the embodiments of the present disclosure can be configured as a receiver (e.g., device 10), transmitter (e.g., device 10-1) or transceiver (e.g., devices 10-2 and 10-3) for communicating with one or more communication devices that together with the wireless device form part of the wireless communications system. Such communication devices can be configured to support one or more radio technologies for wireless communication including, but not limited to, cellular communication devices, wireless networking communication devices, and satellite communication devices. Cellular communication devices can include, for example, 3G devices, 4G/LTE (Long Term Evolution) devices, 5G/LTE devices, CDMA devices, Global System for Mobile Communications (GSM) devices, and the like. CDMA devices may implement various CDMA standards, including, Wideband CDMA (WCDMA), CDMA 1×, Evolution-Data Optimized (EVDO), Time Division Synchronous CDMA (TD-SCDMA), or some other version of CDMA. Wireless networking communication devices can include, for example, wireless local area network (WLAN) devices which can implement IEEE 802.11 standards (commonly referred to as "Wi-Fi"), worldwide interoperability for microwave access (WiMAX) devices which can implement IEEE 802.16 standards, and Bluetooth® devices which implement IEEE 802.15.1 standards. Satellite communication devices can be configured as devices for transmitting and/or receiving global navigation satellite systems (GNSS) signals, global positioning satellite (GPS) signals, military satellite system signals, and the like. Such satellite communication devices can include, for example, ground-based broadcast stations configured to transmit uplink signals to one or more space-based satellite receivers or transceivers and/or receive downlink signals from one or more space-based satellite transmitters or transceivers, and space-based satellite transceivers configured to transmit/receive downlink/uplink signals to/from one or more ground-based transceivers and/or transmit/receive crosslink signals to/from one or more other space-based satellite transceivers. Space-based transmitters, receivers and transceivers are typically implemented on satellites orbiting the Earth at an altitude (e.g., low Earth orbit (LEO), medium Earth orbit (MEO), geostationary orbit (GEO), etc.).

The subdivision of the DPU 32 into separate processing and control elements (i.e., baseband processor 38 and controller 40) is described and illustrated here according to a functional subdivision. More specifically, the baseband processor 38 has been described and illustrated as being functionally separated from the controller 40. The baseband processor 38 as described and illustrated here is a dedicated processor (having one or more computer processors, such as digital signal processors, executing software or firmware) configured to perform tasks associated with signal reception (when the wireless device is configured as a receiver (e.g., device 10) or transceiver (e.g., devices 10-2 and 10-3)) and signal transmission (when the wireless device is configured as a transmitter (e.g., device 10-1) or transceiver (e.g., devices 10-2 and 10-3)). The controller 40 as described and illustrated herein is a dedicated control device (having one or more computer processors, such as microcontrollers or the like, executing software or firmware) configured to perform various control-related tasks, including controlling the DCAs and phase shifters to vary the current amplitudes and phases of propagating signals between a plurality of amplitude and phase states. It should be noted however that these processing and control functions may be performed by processing systems or other logic circuitry hardware which can be subdivided in any desired manner, with one or more function being performed by a single processing system, or by a single function being performed by separate distributed processing systems. For example, the signal processing functions performed by the baseband processor 38 and the control functions performed by the controller 40 can be performed by a single processor module/system/device that provides both signal processing and control functionality.

Implementation of the systems and/or methods of embodiments of the disclosure can involve performing or completing selected tasks implemented by hardware, by software or by firmware or by a combination thereof. For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In certain embodiments of the disclosure, one or more tasks according to exemplary embodiments of systems and/or methods as described herein are performed by a computerized data processor that can execute a plurality of instructions. Optionally, the data processor includes a volatile memory for storing instructions and/or data and/or a non-volatile storage, for example, non-transitory storage media such as a magnetic hard-disk and/or removable media, for storing instructions and/or data.

For example, any combination of one or more non-transitory computer readable (storage) medium(s) may be utilized in accordance with the above-listed embodiments of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of machine-implemented methods are provided herein, some of which can be performed by various embodiments of systems described herein and some of which can be performed according to instructions stored in non-transitory computer-readable storage media described herein. Still, some embodiments of machine-implemented methods provided herein can be performed by other systems and can be performed according to instructions stored in computer-readable storage media other than that described herein, as will become apparent to those having skill in the art with reference to the embodiments described herein. Any reference to systems and computer-readable storage media with respect to machine-implemented methods is provided for explanatory purposes, and is not intended to limit any of such systems and any of such non-transitory computer-readable storage media with regard to embodiments of computer-implemented methods described above. Likewise, any reference to machine-implemented methods with respect to systems and computer-readable storage media is provided for explanatory purposes, and is not intended to limit any of such computer-implemented methods disclosed herein.

The block diagrams and flowcharts in the drawings illustrate the architecture, functionality, and operation of possible implementations of systems and/or methods according to various embodiments of the present disclosure. In this regard, each block in the block diagrams or flowcharts may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method comprising:

providing a test signal to each of a plurality of antenna channels via a test signal line, each antenna channel including an amplitude adjustor and a phase adjustor associated with at least one antenna element;

for each of the antenna channels, modulating the test signal provided to the antenna channel to produce a modulated test signal by: i) controlling the amplitude adjustor of the antenna channel to vary a current amplitude of the test signal between a plurality of amplitude states, and ii) controlling the phase adjustor of the antenna channel to vary a current phase of the test signal between a plurality of phase states, and processing a received test signal received from the antenna channels to determine amplitude and phase errors associated with the modulated test signals associated with the antenna channels, wherein the processing the received signal includes: isolating residual amplitude modulation effects resultant from phase variations imparted by the phase adjustors, and residual frequency modulation effects resultant from amplitude variations imparted by the amplitude adjustors, wherein the processing the received signal includes: isolating residual amplitude modulation effects resultant from phase variations imparted by the phase adjustors, and residual frequency modulation effects resultant from amplitude variations imparted by the amplitude adjustors.

2. The method of claim 1, wherein the test signal is a continuous wave signal.

3. The method of claim 1, wherein the test signal is provided to the antenna channels by a transmitter and the received test signal is received by a receiver, and wherein the received test signal includes a plurality of signal components including at least: i) the modulated test signals associated with the antenna channels, and ii) an unmodulated version of the test signal that is leaked from the transmitter to the receiver.

4. The method of claim 1, wherein the modulated test signal has a constant or variable envelope.

5. The method of claim 1, wherein the amplitude and phase of the test signal are varied in accordance with a sequence of symbols.

6. The method of claim 5, wherein the symbols are selected from an alphabet wherein each symbol in the alphabet corresponds to a different respective phase-state and amplitude-state combination.

7. The method of claim 1, wherein the amplitude and phase of the test signal are varied in accordance with a digital modulation constellation.

8. The method of claim 1, wherein the processing the received signal includes calculating an error vector magnitude.

9. The method of claim 8, wherein the amplitude and phase of the test signal are varied in accordance with a sequence of symbols, and wherein the error vector magnitude is calculated for each received symbol.

10. The method of claim 1, wherein the modulated test signals of a plurality of the antenna channels are produced simultaneously.

11. The method of claim 1, wherein the modulated test signals of the antenna channels are produced sequentially.

12. The method of claim 1, wherein a first of the antenna channels is designated as a reference channel, and wherein: i) the amplitude and phase of the test signal provided to the reference channel are varied, and the received test signal is processed to determine amplitude and phase errors associated with the reference channel, and then ii) the amplitude and phase of the test signal provided to one or more of the remaining antenna channels are varied, and the received test signal is processed to determine amplitude and phase errors, relative to the amplitude and phase errors associated with the reference channel, associated with the one or more remaining antenna channels.

13. The method of claim 1, further comprising: for each of the antenna channels, applying a spreading code to the modulated test signal, wherein the spreading codes are mutually orthogonal.

14. A device comprising:

a plurality of antenna channels, each antenna channel including an amplitude adjustor and a phase adjustor associated with at least one antenna element;

a transceiver unit for providing a test signal to the antenna channels via a test signal line and for receiving a received test signal from the antenna channels; and a processing unit associated with the antenna channels and the transceiver configured to:

for each antenna channel: control the amplitude adjustor of the antenna channel to vary a current amplitude of the test signal between a plurality of amplitude states, and control the phase adjustor of the antenna channel to vary a current phase of the test signal between a plurality of phase states, to produce a modulated test signal, and process the received test signal to determine amplitude and phase errors associated with the modulated test signals associated with the antenna channels, wherein the processing unit is configured to process the received test signal by isolating residual amplitude modulation effects resultant from phase variations imparted by the phase adjustors, and residual frequency modulation effects resultant from amplitude variations imparted by the amplitude adjustors.

15. The device of claim 14, wherein the device is configured to operate in a first mode and a second mode, wherein when the device operates in the first mode: the processing unit controls the amplitude and phase adjustors, for each of the antenna channels, to vary the current amplitude and phase of the test signal to produce the modulated test signal associated with each of the antenna channels, and processes the received test signal to determine amplitude and phase errors in the modulated test signal associated with each of the antenna channels, and wherein when the device operates in the second mode: the transceiver provides a radio frequency (RF) signal to the antenna channels for transmission by the antenna elements or receives an RF signal via the antenna elements, and wherein the processing unit is configured to actuate the amplitude adjustor and the phase adjustor of each antenna channel to adjust a current amplitude and a current phase of the RF signal according to an appropriate one of the amplitude states and an appropriate one of the phase states.

16. The device of claim 14, wherein the device is configured in a configuration selected from the group consisting of: a receiver only for receiving radio frequency signals, as a transmitter only for transmitting radio frequency signals, and as a transceiver for transmitting and receiving radio frequency signals.

17. The device of claim 14, wherein a plurality of transmit paths are provided from the test signal line to output of the antenna channels, and wherein each of the transmit paths is tested separately by passing the test signal to one transmit path at a time.

18. The device of claim 14, wherein a plurality of transmit paths are provided from the test signal line to output of the antenna channels, and wherein the plurality of transmit paths are tested simultaneously by passing the test signal to the plurality of transmit paths.

* * * * *